(12) United States Patent
Nakagawa

(10) Patent No.: US 11,170,146 B2
(45) Date of Patent: Nov. 9, 2021

(54) ANALYSIS SYSTEM, ANALYSIS METHOD, AND PROGRAM

(71) Applicant: NIPPON STEEL CORPORATION, Tokyo (JP)

(72) Inventor: Junichi Nakagawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 3 days.

(21) Appl. No.: 16/646,516

(22) PCT Filed: Mar. 25, 2019

(86) PCT No.: PCT/JP2019/012418
§ 371 (c)(1),
(2) Date: Mar. 11, 2020

(87) PCT Pub. No.: WO2019/188941
PCT Pub. Date: Oct. 3, 2019

(65) Prior Publication Data
US 2020/0272775 A1    Aug. 27, 2020

(30) Foreign Application Priority Data

Mar. 27, 2018 (JP) .............................. JP2018-059579

(51) Int. Cl.
*G06F 30/23* (2020.01)
*G06F 30/17* (2020.01)
*G06F 113/26* (2020.01)

(52) U.S. Cl.
CPC .............. *G06F 30/23* (2020.01); *G06F 30/17* (2020.01); *G06F 2113/26* (2020.01)

(58) Field of Classification Search
CPC ...... G06F 30/23; G06F 30/17; G06F 2113/26; G06F 30/00
See application file for complete search history.

(56) References Cited

U.S. PATENT DOCUMENTS

| 8,285,522 B1 * | 10/2012 | Tryon, III ............... G06F 30/23 703/2 |
| 2006/0282186 A1 | 12/2006 | Hansen et al. |
| 2010/0241243 A1 | 9/2010 | Hans et al. |
| 2015/0170022 A1 | 6/2015 | Malik et al. |
| 2015/0278602 A1 | 10/2015 | Sakashita et al. |

(Continued)

FOREIGN PATENT DOCUMENTS

| EP | 1724716 A1 | 11/2006 |
| EP | 2927673 A1 | 10/2015 |

(Continued)

OTHER PUBLICATIONS

Azuma et al., "Model for the Prediction of Microstructures and Mechanical Properties of Cold-rolled High Strength Steels", Nippon Steel Technical Report, 2012, vol. 392, pp. 45-51, and Corresponding English version document: Nippon Steel Technical Report No. 102 Jan. 2013, total 14 pages.

(Continued)

*Primary Examiner* — Saif A Alhija
(74) *Attorney, Agent, or Firm* — Birch, Stewart, Kolasch & Birch, LLP

(57) ABSTRACT

An analysis apparatus derives a second factor (102) according to a physical phenomenon with which an analysis target (104) is to comply. The analysis apparatus derives, based on the second factor (102), a third factor (103) according to a physical phenomenon with which the analysis target (104) is to comply. The analysis apparatus decides, based on a result of evaluating the third factor (103), a first factor (102) corresponding to the third factor. The second factor (102) indicates a state in the analysis target when the first factor (101) is given to the analysis target (104).

16 Claims, 21 Drawing Sheets

(56) References Cited

U.S. PATENT DOCUMENTS

| | | | |
|---|---|---|---|
| 2017/0124482 A1 | 5/2017 | Yoo et al. | |
| 2018/0376390 A1* | 12/2018 | Gemelos | ........... H04W 36/0005 |

FOREIGN PATENT DOCUMENTS

| | | |
|---|---|---|
| EP | 3 434 552 A1 | 1/2019 |
| JP | 2006-326683 A | 12/2006 |
| JP | 2008-197852 A | 8/2008 |
| JP | 2011-505030 A | 2/2011 |
| JP | 2015-158863 A | 9/2015 |
| JP | 2017-91526 A | 5/2017 |
| WO | WO 2017/164133 A1 | 9/2017 |

OTHER PUBLICATIONS

International Preliminary Report on Patentability for PCT/JP2019/012418 (PCT/IPEA/409) dated Nov. 6, 2019.

International Search Report for PCT/JP2019/012418 dated Jun. 18, 2019.

Kimura et al., "Reinforcement Learning for Partially Observable Markov Decision Processes", Journal of the Japanese Society for Artificial Intelligence, 1997, vol. 12, No. 6, pp. 822-830.

Moulinec et al., "A numerical method for computing the overall response of nonlinear composites with complex microstructure", Comput. Methods Appl. Mech. Engrg., 1998, vol. 157, pp. 69-94.

Srolovitz et al., "Computer Simulation of Recrystallization-I. Homogeneous Nucleation and Growth", Acta metall., 1986, vol. 34, No. 9, pp. 1833-1845.

Written Opinion of the International Searching Authority for PCT/JP2019/012418 (PCT/ISA/237) dated Jun. 18, 2019.

Zeman et al., "A finite element perspective on nonlinear FFT-based micromechanical simulations", International Journal For Numerical Method Engineering, 2017, vol. 111, pp. 903-926.

* cited by examiner

ANALYSIS SYSTEM, ANALYSIS METHOD, AND PROGRAM

TECHNICAL FIELD

The present invention relates to an analysis system, an analysis method, and a program.

BACKGROUND ART

Analysis of a microstructure is performed for designing a material, for example.

Patent Literature 1 describes that a change in Euler angles is obtained as an analysis result of a crystal plasticity model, and a state of a structure is estimated based on the change in the Euler angles. Patent Literature 1 further describes that a mechanical property is obtained based on a microstructure.

Non Patent Literature 1 describes a material prediction model capable of predicting a change in a microstructure during heat treatment and a stress-strain curve.

Further, statistics and machine learning are utilized for designing a material. Patent Literature 2 describes that a neural network is used for predicting an impact resistance of a composite material. Patent Literature 3 describes that a substance model is learned based on a known substance, and an aimed physical property is input to the learned substance model to search for a new substance.

CITATION LIST

Patent Literature

Patent Literature 1: Japanese Laid-open Patent Publication No. 2008-197852
Patent Literature 2: US2015/0170022A1
Patent Literature 3: Japanese Laid-open Patent Publication No. 2017-91526
Patent Literature 4: PCT/JP2017/011010

Non Patent Literature

Non Patent Literature 1: AZUMA Masafumi, and two others, "Model for the Prediction of Microstructures and Mechanical Properties of Cold-rolled High Strength Steels" Nippon Steel Technical Report, No. 392, p. 45 to p. 51, 2012
Non Patent Literature 2: H. Moulinec, P. Suquet, A numerical method for computing the overall response of nonlinear composites with complex microstructure. Comput. Methods Appl. Mech. Engrg. 157 (1998), 69-94
Non Patent Literature 3: J. Zeman, T. W. J. de Geus, J. Vondrejc, R. H. J. Peerlings and M. G. D. Geers, A finite element perspective on nonlinear FFT-based micromechanical simulations Int. J. Numer. Meth. Engng. 111 (2017), 903-926
Non Patent Literature 4: D. J. Srolovitz, G. S. Grest, M. P. Anderson, Computer Simulation of Recrystallization-I. Homogeneous Nucleation and Growth, Acta metal. 34 (1986), 1833-1845

SUMMARY OF INVENTION

Technical Problem

However, in the techniques of Patent Literature 1, Patent Literature 2, and Non Patent Literature 1, it is not possible to estimate a microstructure based on a mechanical property. Further, in the technique of Patent Literature 3, a statistical method is used when estimating a structure of a material based on an aimed value of a property of the material. Therefore, there is no assurance that the structure of the material is physically proper. For this reason, it becomes required to verify that the structure of the material is physically proper. Further, in the techniques of Patent Literature 2 and Patent Literature 3, a target of prediction and searching can be derived only by interpolation, and cannot be derived by extrapolation. Specifically, in the techniques of Patent Literature 2 and Patent Literature 3, it is not possible to obtain a solution which is outside a range where data used during learning exists.

A mechanical property of a material is ascribable to a microstructure of the material. Specifically, the microstructure of the material is set to a cause, and the mechanical property of the material is obtained as a result of the cause. Here, a system corresponding to an object capable of being observed by a microscope (an object which cannot be observed by the naked eye) is set to a micro system. In that case, the microstructure of the material belongs to the micro system. On the other hand, a system corresponding to an object capable of being observed without using the microscope, is set to a macro system. The mechanical property of the material is determined by the entire material. The entire material can be observed without using the microscope. Therefore, the mechanical property of the material belongs to the macro system. Here, a hierarchy in which objects whose sizes occupying a space are nearly equal to each other are classified, is set to a spatial hierarchy. In that case, the micro system and the macro system belong to different spatial hierarchies. The above-described techniques have a problem that, when a cause and a result connected by a physical phenomenon belong to such different spatial hierarchies, it is not easy to accurately estimate the cause from the result.

The present invention has been made in view of the above-described problems, and an object thereof is to accurately estimate, when a cause and a result connected by a physical phenomenon belong to different spatial hierarchies, the cause from the result.

Solution to Problem

One example of a means for solving the above-described problems is as follows.

(1) An analysis system is characterized in that it includes: a first deriving means that derives a second factor indicating a state in an analysis target when a first factor is given to the analysis target, according to a physical phenomenon with which the analysis target is to comply; a second deriving means that derives, based on the second factor derived by the first deriving means, a third factor according to a physical phenomenon with which the analysis target is to comply; and a deciding means that decides, based on a result of evaluating the third factor derived by the second deriving means, the first factor corresponding to the third factor, in which: the third factor is a factor indicating a result occurred in the analysis target with the first factor and the second factor as a cause; the second factor is a factor individually determined with respect to each of components of the analysis target; the third factor is not a factor individually determined with respect to each of the components of the analysis target but is a factor determined with respect to a set of the components of the analysis target; when an evaluation value with respect to the third factor derived by the second deriving means does not satisfy a predetermined condition, the second factor is newly derived by the first deriving means and the third factor is newly derived by the second deriving means with respect to the analysis target being a new one; and a state of the component in the new analysis target is the second factor being a latest one derived by the first deriving means.

(2) The analysis system described in (1) is characterized in that the first deriving means derives the second factor by using a mathematical expression based on a physical phenomenon with which the analysis target is to comply.

(3) The analysis system described in (1) or (2) is characterized in that the second deriving means derives the third factor by using a mathematical expression based on a physical phenomenon with which the analysis target is to comply.

(4) The analysis system described in any one of (1) to (3) is characterized in that, when the evaluation value with respect to the third factor derived by the second deriving means satisfies the predetermined condition, the deciding means decides the first factor used for deriving the third factor, as the first factor corresponding to the third factor.

(5) The analysis system described in any one of (1) to (4) is characterized in that, when the evaluation value with respect to the third factor derived by the second deriving means satisfies the predetermined condition, the deciding means decides a plurality of the first factors used until when the predetermined condition is satisfied, as the first factors corresponding to the third factor.

(6) The analysis system described in (5) is characterized in that it further includes a creating means that creates, from information indicating the analysis target being an initial one, a learning model of deriving the plurality of first factors corresponding to the third factor satisfying the predetermined condition, through performance of reinforcement learning, in which the creating means has the first deriving means and the second deriving means.

(7) The analysis system described in (6) is characterized in that the reinforcement learning is Q-learning.

(8) The analysis system described in (6) or (7) is characterized in that it further includes an estimating means that estimates the plurality of first factors corresponding to the third factor satisfying the predetermined condition, by using the learning model, in which each of the creating means and the estimating means has the first deriving means and the second deriving means.

(9) The analysis system described in (8) is characterized in that: the analysis target is a product; the first factor is a factor indicating contents of transition of a component of the product; the second factor is a factor indicating a state after the transition of the component of the product; the third factor is a factor determined with respect to a set of the components of the product; and a production process of the product is decided based on the first factors estimated by the estimating means, and the product is produced by using the production process.

(10) The analysis system described in (8) or (9) is characterized in that: the analysis target is a material having a microstructure; the first factor is a factor indicating contents of transition of a state of the microstructure of the material; the second factor is a factor indicating a state after the transition of the microstructure of the material; the third factor is a factor regarding a mechanical property in the entire material; and a production process of the material is decided based on the first factors estimated by the estimating means, and the material is produced by using the production process.

(11) The analysis system described in any one of (1) to (10) is characterized in that: an algorithm of Markov decision processes is used when deciding the first factor corresponding to the third factor; a state in the Markov decision processes is a state of a component of the analysis target; an action in the Markov decision processes is the first factor; a reward in the Markov decision processes is the third factor; and the second factor transits according to the first factor.

(12) The analysis system described in any one of (1) to (11) is characterized in that: the analysis target is a product; the first factor is a factor indicating contents of transition of a state of a component of the product; the second factor is a factor indicating a state after the transition of the component of the product; and the third factor is a factor determined with respect to a set of the components of the product.

(13) The analysis system described in any one of (1) to (12) is characterized in that: the analysis target is a material having a microstructure; the first factor is a factor indicating contents of transition of a state of the microstructure of the material; the second factor is a factor indicating a state after the transition of the microstructure of the material; and the third factor is a factor regarding a mechanical property in the entire material.

(14) The analysis system described in (13) is characterized in that the second deriving means derives the third factor based on a microstructure obtained by performing a phase transformation on a microstructure in a state indicated by the second factor derived by the first deriving means.

(15) An analysis method is characterized in that it includes: a first deriving step of deriving a second factor indicating a state in an analysis target when a first factor is given to the analysis target, according to a physical phenomenon with which the analysis target is to comply; a second deriving step of deriving, based on the second factor derived by the first deriving step, a third factor according to a physical phenomenon with which the analysis target is to comply; and a deciding step of deciding, based on a result of evaluating the third factor derived by the second deriving step, the first factor corresponding to the third factor, in which: the third factor is a factor indicating a result occurred in the analysis target with the first factor and the second factor as a cause; the second factor is a factor individually determined with respect to each of components of the analysis target; the third factor is not a factor individually determined with respect to each of the components of the analysis target but is a factor determined with respect to a set of the components of the analysis target; when an evaluation value with respect to the third factor derived by the second deriving step does not satisfy a predetermined condition, the second factor is newly derived by the first deriving step and the third factor is newly derived by the second deriving step with respect to the analysis target being a new one; and a state of the component in the new analysis target is the second factor being a latest one derived by the first deriving step.

(16) A program is characterized in that it makes a computer execute: a first deriving step of deriving a second factor indicating a state in an analysis target when a first factor is given to the analysis target, according to a physical phenomenon with which the analysis target is to comply; a second deriving step of deriving, based on the second factor derived by the first deriving step, a third factor according to a physical phenomenon with which the analysis target is to comply; and a deciding step of deciding, based on a result of evaluating the third factor derived by the second deriving step, the first factor corresponding to the third factor, in which: the third factor is a factor indicating a result occurred in the analysis target with the first factor and the second factor as a cause; the second factor is a factor individually determined with respect to each of components of the analysis target; the third factor is not a factor individually determined with respect to each of the components of the analysis target but is a factor determined with respect to a set of the components of the analysis target; when an evaluation value with respect to the third factor derived by the second deriving step does not satisfy a predetermined condition, the second factor is newly derived by the first deriving step and the third factor is newly derived by the second deriving step with respect to the analysis target being a new one; and a state of the component in the new analysis target is the second factor being a latest one derived by the first deriving step.

DESCRIPTION OF EMBODIMENTS

<<Circumstances>>

Figure 1:
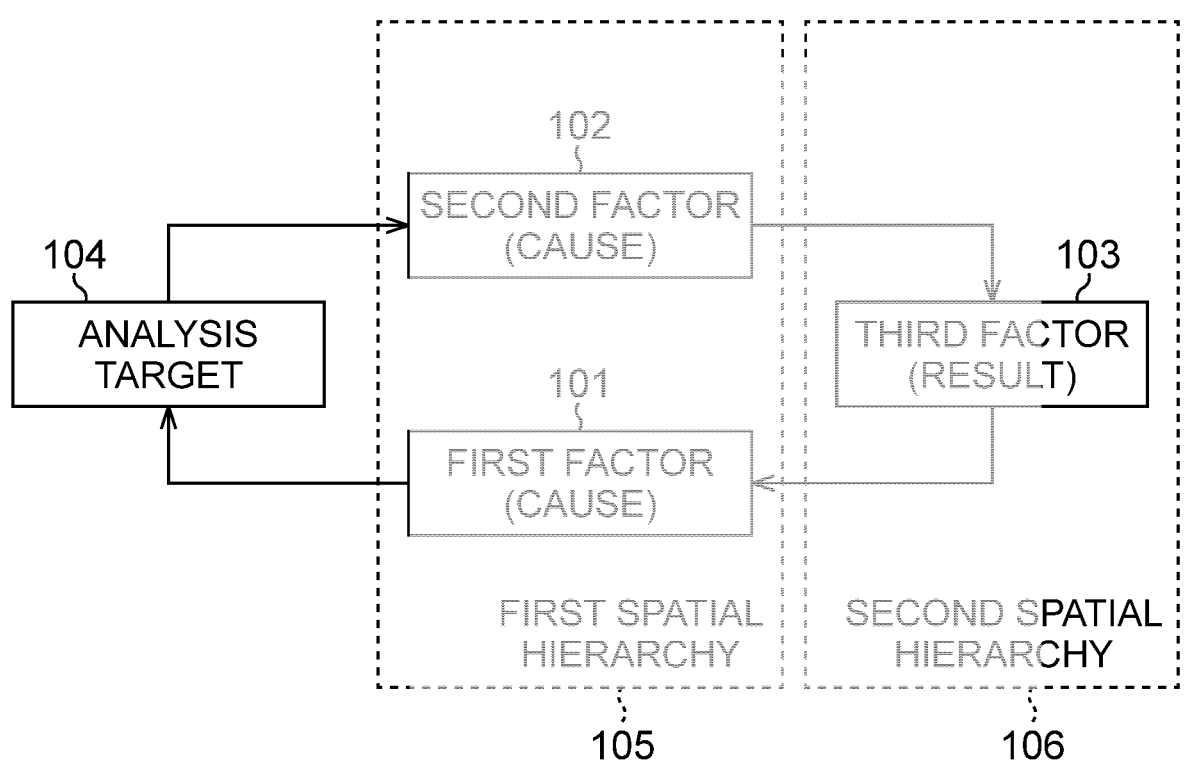
FIG. 1 is a view explaining an outline of processing to be a base.

Before explaining embodiments, circumstances leading to the embodiments will be described. The present inventors conceived an idea that, in an analysis target, a factor to be a cause and a factor to be a result occurred by the factor are associated in a bidirectional manner, and in addition to that, the factor to be the cause is estimated from the factor to be the result by performing not only interpolation but also extrapolation. For example, when a structural material is designed, a factor in a micro system becomes a cause, and a factor in a macro system becomes a result.

Here, the factor in the micro system is a factor determined by a unit of a predetermined region capable of being observed by a microscope. The factor in the micro system is, for example, a control factor when producing a material. As such a control factor, there can be cited, for example, a form and an orientation of a three-dimensional microstructure, an addition amount of an alloy, and a compounding amount, a form distribution, a strength, and so on of each of a hard phase and a soft phase. Further, the factor in the macro system is a factor determined with respect to the entire material. The factor in the macro system is, for example, a mechanical property of the structural material (the entire structural material).

As in the techniques described in Patent Literatures 2, 3, in the existing technique, the prime object is to quantify a correlation between the factor in the micro system and the factor in the macro system based on theories of statistics and machine learning. In such a technique, it is possible to obtain information that contributes to design of a material without using a physical law, if there is a large amount of and significant data. However, in a case of the material, for example, the number of samples of data is about several hundreds at most. Besides, data to be used during learning includes various kinds of data such as image data, audio data, and numeric data, and thus is not data of a decided format. For this reason, there is a possibility that the leaning cannot be performed sufficiently. Further, in the existing technique, although the interpolation can be performed, the extrapolation cannot be performed, as described above.

Accordingly, the present inventors focused attention on a technique of inverse problem analysis. In the inverse problem analysis, a physical law that dominates a system to be a target is expressed by a model using a partial differential equation or the like. In the inverse problem analysis, an initial condition or a boundary condition being a cause of bringing about a measured result, is decided by using the model. The present inventors considered that when the inverse problem analysis is employed, a solution according to the physical law can be obtained through the model, so that it becomes possible to perform the extrapolation.

However, the model used in the inverse problem analysis is normally a differential equation which rationally describes a physical phenomenon in the same spatial hierarchy. Therefore, when data used for learning lies across a plurality of spatial hierarchies, it is required to set a different model for each of the spatial hierarchies. For this reason, it is difficult to quantitatively handle the aforementioned causal relation between the spatial hierarchies. As described above, the spatial hierarchy is a hierarchy in which objects whose sizes occupying a space are nearly equal to each other are classified. The judgment regarding whether the sizes occupying the space are nearly equal or not, is different depending on the target of the classification. Here, it is assumed that a size of each of components of the analysis target occupying a space and a size of a set of the components of the analysis target (the entire analysis target) occupying the space are not nearly equal to each other.

For example, the aforementioned micro system and macro system belong to mutually different spatial hierarchies. In this case, a physical phenomenon in the same spatial hierarchy indicates each of a physical phenomenon in the micro system and a physical phenomenon in the macro system.

Other than the above, a finished product and a part also belong to mutually different spatial hierarchies. In this case, a physical phenomenon in the same spatial hierarchy indicates each of a physical phenomenon in the part and a physical phenomenon in the finished product.

As described above, the spatial hierarchy to which each of the components of the analysis target belongs and the spatial hierarchy to which the set of the components of the analysis target (the entire analysis target) belongs, are different spatial hierarchies.

Based on the above-described circumstances, the present inventors found out that, if it is possible to express a causal relation of a physical phenomenon between spatial hierarchies in accordance with a physical law (by using a mathematical expression that expresses a physical phenomenon), a factor regarding a component of an analysis target can be decided from a result of evaluating a factor which is determined with respect to a set of the components of the analysis target (the entire analysis target).

<<Outline of Processing>>

Next, an outline of processing to be a base in embodiments to be described later will be explained while referring to FIG. 1.

A first factor 101 is given to an analysis target 104. The first factor 101 is a factor regarding a state of each of components of the analysis target 104. The first factor 101 is, for example, a factor indicating contents of transition of a state the component of the analysis target 104. The first factor 101 may also be, for example, a factor indicating a state of the component of the analysis target 104. The analysis target 104 is, for example, a structural material or a product. In this case, the analysis target 104 is an analysis target object.

An analysis apparatus makes a state of the analysis target 104 to which the first factor 101 is given transit to derive a second factor 102. The second factor 102 is a factor indicating the state of the analysis target 104 when the first factor 101 is given to the analysis target 104. Note that the second factor 102 is a factor individually determined with respect to each of components of the analysis target 104. The analysis apparatus derives the second factor 102 according to a physical phenomenon with which the analysis target 104 is to comply. The first factor 101 and the second factor 102 are associated with each other by a mathematical expression based on the physical phenomenon with which the analysis target 104 is to comply.

The analysis apparatus derives a third factor 103 based on the second factor 102. The third factor 103 is a factor determined with respect to a set of the components of the analysis target 104 (the entire analysis target 104). The third factor 103 is not a factor which is individually determined with respect to each of the components of the analysis target 104. Such a third factor 103 is a factor indicating a result occurred in the analysis target 104 with the first factor 101 and the second factor 102 set as a cause. The first factor 101 and the second factor 102 belong to the same spatial hierarchy. The first factor 101 and the second factor 102, and the third factor 103 belong to different spatial hierarchies. FIG. 1 exemplifies a case where the first factor 101 and the second factor 102 belong to a first spatial hierarchy 105, and the third factor 103 belongs to a second spatial hierarchy 106.

The analysis apparatus derives the third factor 103 according to a physical phenomenon with which the analysis target 104 is to comply. The second factor 102 and the third factor 103 are associated with each other by a mathematical expression based on the physical phenomenon with which the analysis target 104 is to comply.

The analysis apparatus decides, based on a result of evaluating the third factor 103, the first factor 101 corresponding to the third factor 103. When an evaluation value with respect to the third factor 103 does not satisfy a predetermined condition, the analysis apparatus sets a new analysis target 104. The analysis apparatus performs derivation of the second factor 102 and derivation of the third factor 103 with respect to the new analysis target 104.

The analysis apparatus updates the first factor 101 when setting the new analysis target 104. When the first factor 101 is a factor indicating contents of transition of a state of a component of the analysis target 104, the analysis apparatus selects the first factor 101. In this case, a state of a component of the new analysis target 104 becomes one indicated by the latest second factor 102 among already-derived second factors 102. To the new analysis target 104, the first factor 101 selected as described above is given.

When the first factor 101 is a factor indicating the state of the component of the analysis target 104, the updated first factor 101 is given as the state of the component of the new analysis target 104.

The analysis apparatus repeats the selection and the update of the first factor 101, the derivation of the second factor 102, and the derivation of the third factor 103 until when the evaluation value with respect to the third factor 103 satisfies the predetermined condition. When the evaluation value with respect to the third factor 103 satisfies the predetermined condition, the analysis apparatus decides the first factor 101 used for deriving the third factor 103, as the first factor 101 corresponding to the third factor 103.

When the first factor 101 is a factor indicating the contents of transition of the state of the component of the analysis target 104, the analysis apparatus decides all of the first factors 101 obtained by the aforementioned repetition processing, as the first factors 101 corresponding to the third factor 103. The combination of all of the first factors 101 becomes a guideline for a method of deriving the third factor 103.

When the first factor 101 is a factor indicating the state of the component of the analysis target 104, the analysis apparatus decides the latest first factor 101 among the first factors 101 obtained by the aforementioned repetition processing, as the first factor 101 corresponding to the third factor 103. The first factor 101 becomes a guideline for deriving the third factor 103.

In embodiments to be described below, various kinds of processing are executed based on the processing of solving the inverse problem in a manner as described above. Here, the inverse problem is a problem in which from a result (the third factor 103), a cause of the result (the first factor 101) is decided. Further, as described above, the third factor 103 and the first factor 101 belong to the different spatial hierarchies. An inverse problem dealt in the embodiments to be described later, is a problem connecting the factors that belong to such different spatial hierarchies.

<<Markov Decision Processes>>

Based on the above-described findings, the present inventors found out that such an inverse problem can be solved in a frame of Markov decision processes. The Markov decision processes will be described. Note that the Markov decision processes themselves can be realized by a well-known technique. Therefore, only an outline thereof will be described here.

The Markov decision processes are for learning a policy with which an agent maximizes a reward. The Markov decision processes deal with an optimization problem in which an action which should be taken for a state of an environment is decided by try and error.

The Markov decision processes are expressed by the following four elements. Note that t represents a time, which takes a value such as 0, 1, 2, ..., and N and K represent the number of elements of a finite set of states and the number of elements of a finite set of actions, respectively.

Finite set S of states $s=\{s^1, s^2, \ldots, s^N\}$
Finite set A of actions $a=\{a^1, a^2, \ldots, a^K\}$
Transition function $f(s_{t+1}|s_t, a_t)$
Reward function $r(s_t, a_t, s_{t+1})$ The transition function $f(s_{t+1}|s_t, a_t)$ is a function in which a state $s_t$ at a time t transits to a state $s_{t+1}$ at a next time t+1 when an action $a_t$ is taken or a probability density distribution function.

The reward function $r(s_t, a_t, s_{t+1})$ expresses an immediate reward obtained when the state $s_t$ at the time t transits to the state $s_{t+1}$ at the next time t+1 by taking the action $a_t$ at the time t, or an expected value of the immediate reward.

Generally, in the Markov decision processes, a mapping $\pi$ which makes an action a which should be taken by an agent when a current state s is given, correspond to the current state s in a form of a distribution function (probability density function) p(a|s) of the action a, is called a policy $\pi$. An objective function $\rho$ used when deciding the policy $\pi$ uses a cumulative value of discounted rewards from the time t=0 to a future time t=$t_\infty$, as in the following expression (1).

[Mathematical expression 1]

$$\rho = \sum_{t=0}^{t_\infty} \gamma^t r_{t+1} \quad (1)$$

Here, $\gamma \in [0,1]$ is a value called a discount factor, and represents a difference in a level of importance between a current reward and a future reward. "1" is set as $\gamma$ to the reward with the highest level of importance, "0" is set as $\gamma$ to the reward with the lowest level of importance, and a value of greater than 0 and less than 1 is set to the other rewards according to the level of importance. t described on the upper right of the discount factor $\gamma$ means an exponent. $r_{t+1}$ indicates an immediate reward obtained when the state $s_t$ at the time t transits to the state $s_{t+1}$ at the next time t+1 by taking the action $a_t$ at the time t.

A goal of the Markov decision processes is to find out an optimum policy $\pi^*$ for obtaining the maximum reward, as in the following expression (2).

[Mathematical expression 2]

$$\pi^* = \underset{\pi}{\mathrm{argmax}}\{E[\rho|\pi]\} \quad (2)$$

Here, $E[\rho|\pi]$ represents an expected value of the objective function $\rho$ when the policy $\pi$ is taken (a cumulative value of discounted rewards (referred to as "cumulative reward", hereinafter)).

There are various methods as a method of deriving the optimum policy $\pi^*$ as in the expression (2), and as one of the methods, there is an algorithm called dynamic programming. In the dynamic programming, it is set that the action a which should be taken by the agent is determined by the policy $\pi$ in a deterministic manner. The dynamic programming itself is a well-known technique, so that detailed explanation thereof will be omitted here.

First Embodiment

Hereinafter, a first embodiment will be described.

In the present embodiment, it is assumed that an analysis target is DP (Dual Phase) steel. Further, it is assumed that a first factor is a factor indicating contents of transition of a state of a microstructure of the DP steel. Further, it is assumed that a second factor is a factor indicating a state after the transition of the microstructure of the DP steel. Besides, it is assumed that a third factor is an S-S curve of the DP steel. Further, in the present embodiment, explanation will be made by assuming that the microstructure of the DP steel includes no region (air gap and the like) except for a hard phase (a martensite phase) and a soft phase (a ferrite phase), in order to simplify the explanation. The present inventors found out that by using these factors, it is possible to solve the inverse problem in the frame of the Markov decision processes. Accordingly, explanation regarding these factors will be made first.

[S-S Curve]

The S-S curve being one example of the third factor will be described.

Figure 2:
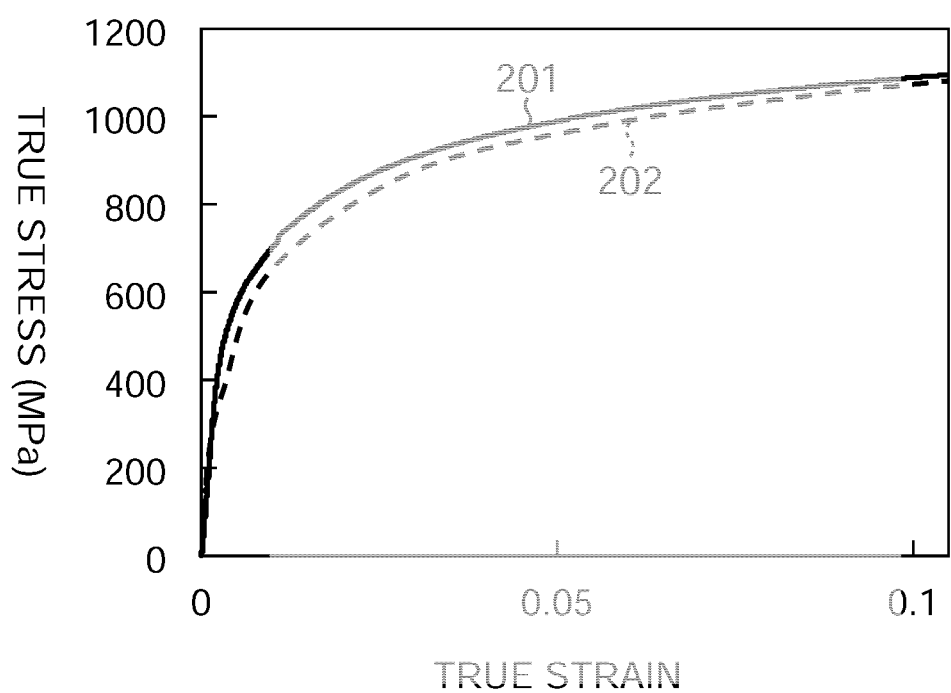
FIG. 2 is a view illustrating one example of an S-S curve.

FIG. 2 is a view illustrating one example of the S-S curve. As illustrated in FIG. 2, the S-S curve is a curve representing a relationship between a stress and a strain. In the example illustrated in FIG. 2, the S-S curve represents a relationship between a true stress and a true strain. However, the S-S curve is not limited to the curve representing the relationship between the true stress and the true strain as long as it is a curve representing the relationship between the stress and the strain. The S-S curve can be obtained by performing a tensile test or a compression test on the DP steel. Therefore, the S-S curve is a factor determined with respect to a set of the microstructures of the DP steel. The S-S curve is a factor regarding a mechanical property in the entire DP steel. Therefore, the S-S curve is determined with respect to only the entire DP steel. Specifically, the S-S curve is not a factor which is individually determined with respect to each of the microstructures of the DP steel. In the present embodiment, a difference between an S-S curve 201 to be an aim and an S-S curve 202 derived in a manner as will be described later, becomes an evaluation value with respect to the aforementioned third factor. Further, the aforementioned predetermined condition is that the difference between the S-S curve to be the aim and the S-S curve derived in a manner as will be described later falls within a predetermined range. In the explanation hereinbelow, the S-S curve to be the aim is referred to as an aimed S-S curve according to need.

The S-S curve corresponds to the reward in the Markov decision processes. Further, a processing procedure for deriving the S-S curve corresponds to the reward function $r(s_t, a_t, s_{t+1})$

[Homogenization Method]

In the present embodiment, the S-S curve of the DP steel is derived according to a physical phenomenon that occurs in the DP steel. The microstructure of the DP steel and the S-S curve belong to different spatial hierarchies. In the present embodiment, explanation will be made by citing a case, as an example, where a homogenization method is employed as a method of consistently and logically explaining a causal relation of the physical phenomenon between spatial hierarchies.

One example of a method of deriving the S-S curve from information regarding the microstructure by using the homogenization method will be described.

First, an external strain (an external force to be a tensile load) which is applied to the DP steel is set. Subsequently, a stress $\sigma(x)$ and a strain $\varepsilon(x)$ at each position x of the microstructure when the set external strain is applied to the DP steel, are derived by an elastoplasticity analysis. Here, explanation will be made by citing a case, as an example, where each position x of the microstructure is set to (a position of) each voxel x of the microstructure, in order to simplify the explanation.

In the elastoplasticity analysis, a displacement $u_{t+1}(x)$ of each voxel according to the external strain is derived. After that, by using a relational expression between the strain and the displacement, a strain $\varepsilon_{t+1}(u_{t+1})(x)$ of each voxel when the displacement $u_{t+1}(x)$ occurs in each voxel is derived. Besides, by using a relational expression between the stress and the strain, a stress $a_{t+1}(\varepsilon_{t+1}(u_{t+1})(x)$ of each voxel when the strain $\varepsilon_{t+1}(u_{t+1})(x)$ occurs in each voxel is derived.

In the homogenization method, the displacement $u_{t+1}(x)$ in each voxel is derived so as to minimize a strain energy of the DP steel being the analysis target expressed in the following expression (3). Further, from the derived displacement $u_{t+1}(x)$, the strain $\varepsilon_{t+1}(u_{t+1})(x)$ and the stress $\sigma_{t+1}(\varepsilon_{t+1}(u_{t+1}))(x)$ are derived. The expression (3) is one example of a mathematical expression representing a physical phenomenon with which the DP steel is to comply.

[Mathematical expression 3]

$$\int_Q (\chi_{t+1}(x)C_A + (1-\chi_{t+1}(x))C_B)(\xi_{t+1}+\Delta\varepsilon_{t+1}(u)(x)) : (\xi_{t+1}+\Delta\varepsilon_{t+1}(u)(x))dx \qquad (3)$$

Here, $\chi_{t+1}(x)$ is a value of a binarized label in the voxel at the position x. Here, a value $\chi_{t+1}(x)$ of the binarized label in a case of a soft phase is set to "1". A value $\chi_{t+1}(x)$ of the binarized label in a case of a hard phase is set to "0". Therefore, when the voxel at the position x is the hard phase, this is expressed by $1-\chi_{t+1}(x)$. $C_A$ is a compliance (tensor) indicating a relationship between a stress and a strain when the soft phase is subjected to elasto-plastic deformation. $C_B$ is a compliance (tensor) indicating a relationship between a stress and a strain when the hard phase is subjected to elasto-plastic deformation. $\xi_{t+1}$ represents the external strain. $\Omega$ represents the entire region of the DP steel being the analysis target: represents that a product of tensors in front of and behind: is taken.

"$(\chi_{t+1}(x) C_A+(1-\chi_{t+1}(x))C_B)(\xi_{t+1}+\Delta\varepsilon_{t+1}(u)(x))$" in front of: of the expression (3) represents a stress which occurs in a voxel at the position x due to a displacement of the voxel by u(x) when the external strain $\xi_{t+1}$ is applied. "$(\xi_{t+1}+\Delta\varepsilon_{t+1}(u)(x))$" behind: of the expression (3) represents a strain which occurs in the voxel at the position x due to the displacement of the voxel by u(x) when the external strain $\xi_{t+1}$ is applied. The product of these tensors becomes a strain energy in the voxel at the position x. The expression (3) expresses accumulation (integration) of strain energies in all voxels. The displacement $u_t(x)$ of the voxel at each of all positions x is derived to minimize a value of the accumulation.

In a manner as described above, a pair of the strain $\varepsilon_{t+1}(u_{t+1})(x)$ and the stress $\sigma_{t+1}(\varepsilon_{t+1}(u_{t+1}))(x)$ is derived with respect to each of the voxels at all positions x.

When, in a case where a certain external strain is applied to the DP steel, a pair of the strain $\varepsilon_t(u_t)(x)$ and the stress $\sigma_t(\varepsilon_t(u_t))(x)$ is derived with respect to each of the voxels at all positions x, central values (average values, for example) of $\varepsilon_t(u_t)(x)$ and stresses $\sigma_t(\varepsilon_t(u_t))(x)$ in the voxels at all positions x are derived. Consequently, it is possible to obtain one pair of the strain and the stress of the DP steel when the certain external strain is applied to the DP steel.

The derivation of the central values of the tensile strength and the uniform elongation of the DP steel in a manner as above is carried out in each of cases where a plurality of external strains are applied to the DP steel. Consequently, it is possible to obtain a plurality of pairs of the strain and the stress of the DP steel. From these pairs, it is possible to obtain an S-S curve being a relational expression between the stress and the strain.

Note that the strain $\varepsilon_{t+1}(u_{t+1})(x)$ and the stress $\sigma_{t+1}(\varepsilon_{t+1}(u_{t+1}))(x)$ are derived by the homogenization method as described above. The S-S curve is derived from the strain $\varepsilon_{t+1}(u_{t+1})(x)$ and the stress $\sigma_{t+1}(\varepsilon_{t+1}(u_{t+1}))(x)$. Further, the homogenization method itself can be realized by using a well-known technique such as one described in Non Patent Literatures 2, 3, for example. The entire contents of Non Patent Literatures 2, 3 are incorporated herein by reference.

[State and Transition of Microstructure]

A state of the microstructure being one example of the second factor and contents of transition of the microstructure being one example of the first factor will be described.

Figure 3:
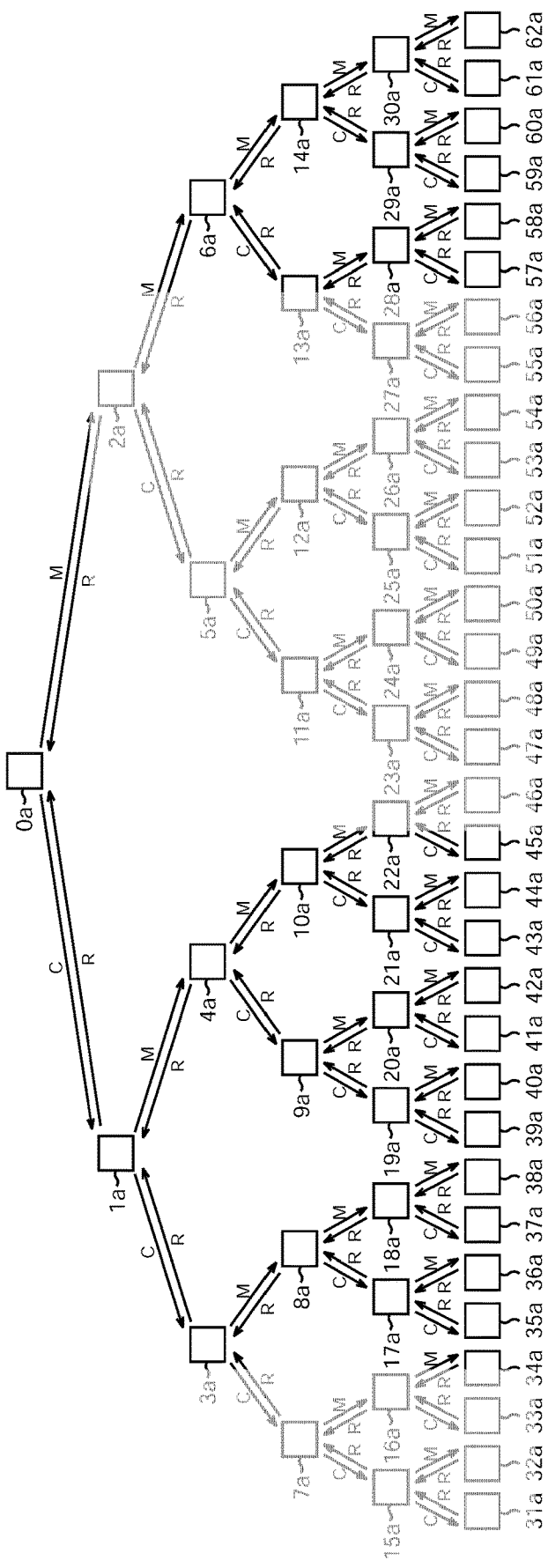
FIG. 3 is a view illustrating a first embodiment and explaining one example of transition of states of microstructures.
Figure 4:
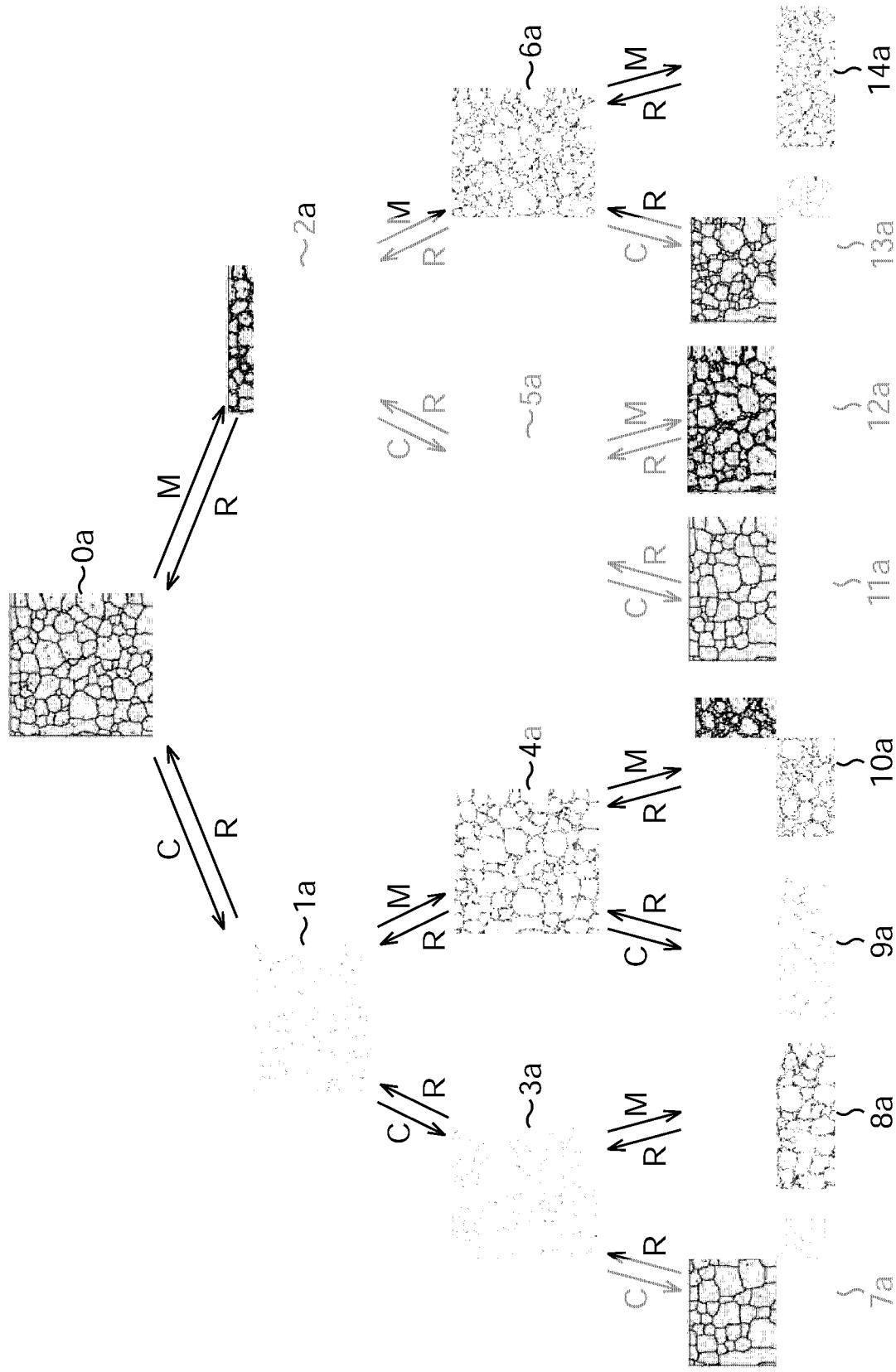
FIG. 4 is a view illustrating the first embodiment and illustrating one example of images of the microstructures.

FIG. 3 is a view explaining one example of transition of states of microstructures. In FIG. 3, a quadrangle indicates an image of the microstructure. FIG. 3 illustrates 63 images 0a to 62a of the microstructures. FIG. 4 is a view illustrating one example of images of the microstructures. In FIG. 4, only 15 images 0a to 14a of the microstructures, out of the 63 images 0a to 62a of the microstructures, are represented as a matter of convenience of illustration. The illustration of concrete contents of the other images 15a to 62a of the microstructures is omitted.

The image of the microstructure corresponds to an environment. A state of the microstructure corresponds to a state in the Markov decision processes. In the example illustrated in FIG. 3, a finite set S of states s becomes $S=\{s^0, s^2, \ldots, s^{62}\}$. Information indicating the state of the microstructure includes, for example, a grain boundary and an orientation of a crystal grain, and a distribution of element concentration in the microstructure. In the present embodiment, it is assumed that each state $s^n$ of the finite set S of the states s includes these pieces of information as its element. In the present embodiment, it is assumed that the images 0a to 62a of the microstructures include the information regarding the grain boundary and the orientation of the crystal grain and the information regarding the distribution of the element concentration in the microstructure. The state of the microstructure is individually determined with respect to each of the microstructures.

The contents of transition of the state of the microstructure include "coarsening", "miniaturization", and "return". The "coarsening" indicates that crystal growth is performed. The "miniaturization" indicates that recrystallization or phase transformation is performed. The "return" indicates that a state returns to a state at the previous time t. When the "coarsening" is performed on the state at the previous time t, the "return" corresponds to performance of the "miniaturization". When the "miniaturization" is performed on the state at the previous time t, the "return" corresponds to performance of the "coarsening".

In FIG. 3 and FIG. 4, C represents the "coarsening". M represents the "miniaturization". R represents the "return". In FIG. 3 and FIG. 4, an arrow line of R paired with an arrow line of C corresponds to the "miniaturization". An arrow line of R paired with an arrow line of M corresponds to the "coarsening".

At the time t, the state of the microstructure is assumed to transit only to an adjacent state connected by one arrow line indicated in FIG. 3 and FIG. 4. For example, at the time t, the state of the image 1a of the microstructure transits only to any one of the states of the images 0a, 3a, 4a of the microstructures. For example, at the time t, the state of the image 1a of the microstructure never transits to the state of the image 7a of the microstructure by skipping the image 3a of the microstructure.

In the state of the image 0a of the microstructure, there is no chance that the "return" is selected. In the state of the image 0a of the microstructure, the "coarsening" or the "miniaturization" is selected. In the states of the images 31a to 62a of the microstructures, there is no chance that the "coarsening" and the "miniaturization" are selected. In the states of the images 31a to 62a of the microstructures, only the "return" is selected.

The contents of transition of the state of the microstructure corresponds to the action in the Markov decision processes. In the state of the image 0a of the microstructure, the "coarsening" or the "miniaturization" is selected as the action a at the time t. In the states of the images 31a to 62a of the microstructures, only the "return" is selected as the action a at the time t. In the states of the other images 1a to 30a of the microstructures, the "coarsening", the "miniaturization", or the "return" is selected as the action a at the time t.

As described above, in the present embodiment, the number of times t of the transition of the state of the microstructure is used as one corresponding to the time t in the Markov decision processes.

In FIG. 3 and FIG. 4, the image 0a of the microstructure out of the images 0a to 62a of the microstructures is an input image. The image 0a of the microstructure can be obtained by using a well-known measurement technique such as an EBSD (Electron Backscattering Diffraction) method, an optical microscope, or a SEM (Scanning Electron Microscope), with respect to the DP steel, for example. Therefore, detailed explanation thereof will be omitted here. The image of the microstructure may by a three-dimensional image or a two-dimensional image.

Each of the images 1a to 62a of the microstructures is generated based only on an image positioned at a starting point of the arrow line of C or the arrow line of M extending toward each of the images. The starting point of the arrow line is an end point with no arrowhead out of two end points of the arrow line. Concretely, for example, the images 1a, 2a of the microstructures are generated based only on the image 0a of the microstructure. The images 3a, 4a of the microstructures are generated based only on the image 1a of the microstructure.

The transition of the states of the images 0a to 62a of the microstructures is performed according to a physical phenomenon that occurs in the DP steel. In the present embodiment, explanation will be made by citing a case, as an example, where the images 1a to 62a of the microstructures are generated by performing a simulation based on a Monte Carlo method using a Potts model.

Figure 5:
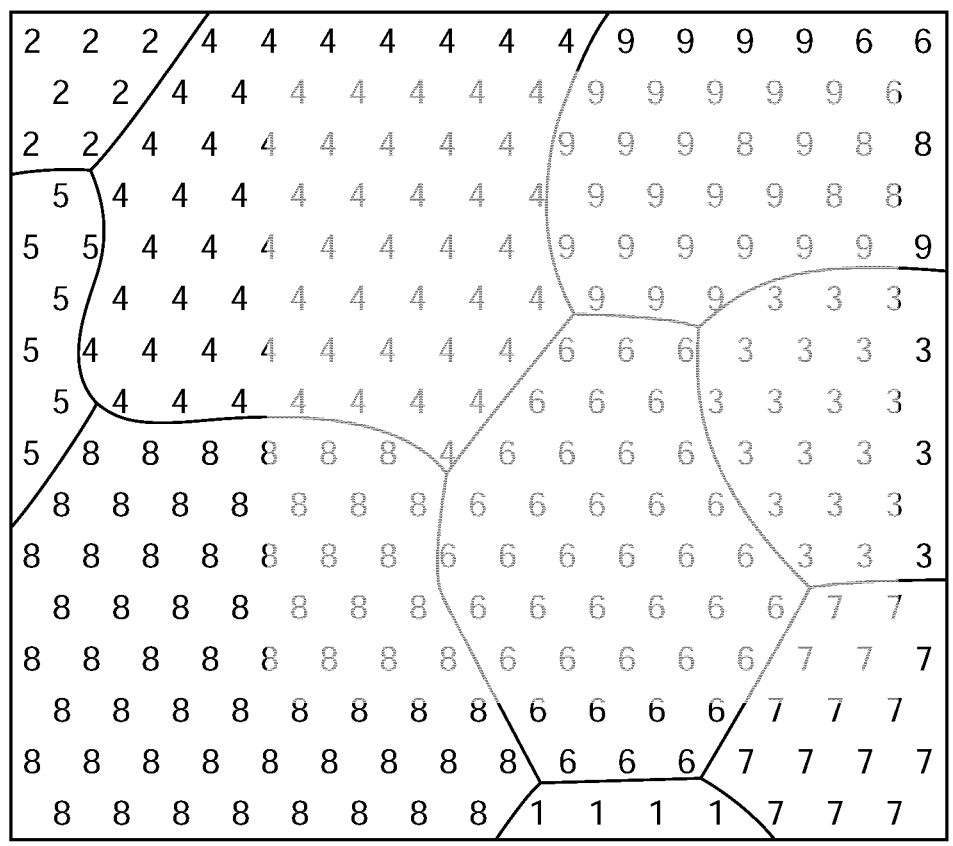
FIG. 5 is a view illustrating the first embodiment and explaining one example of a method of generating an image of a microstructure.

FIG. 5 is a view explaining one example of a method of generating the images 1a to 62a of the microstructures. In FIG. 5, numeric values 1 to 9 are values indicating crystal orientations. The same numeric value indicates the same crystal orientation. Further, in FIG. 5, a line indicates a grain boundary. Further, a position at which the numeric value is given is a position of a lattice point. The position of the lattice point corresponds to, for example, a position where an electron beam is irradiated in the measurement based on the EBSD method.

Here, explanation will be made by citing a case, as an example, where the images 1a, 2a of the microstructures are generated based on the image 0a of the microstructure.

The simulation is performed through the following procedures (A) to (G). Note that in this case, it is assumed that a region is finite. Namely, the number of lattice points is a finite number.

(A) One lattice point i is randomly selected from all lattice points.

(B) An orientation $S_i'$ ($1 \leq S_i' \leq Q$) which is different from an orientation $S_i$ ($1 \leq S_i \leq Q$) at the lattice point i is randomly selected.

(C) An energy difference $\Delta \Sigma$ ($=E(S_i')-E(S_i)$) is derived.

The energy $E(S_i)$ of the orientation $S_i$ is expressed by the following expression (4).

[Mathematical expression 4]

$$E(S_i) = \sum_{j \in n.n.} J_{p_i p_j}(1 - \delta_{S_i S_j}) + H\theta(Q_u - S_i) \qquad (4)$$

$\delta_{sisj}$ is Kronecker delta. $\delta_{sisj}$ takes 1 when $S_i=S_j$, and it takes 0 when $S_i \neq S_j$. n·n represents a lattice point within a nearest neighborhood of the lattice point i. $J_{pi,pj}$ is a constant representing a magnitude of a surface energy. $J_{pi,pj}$ is a value exceeding 0 ($J_{pi,pj}>0$). $p_i$ represents a parent phase (non-recrystallized region) $p_m$ or a new phase (crystallized region) $p_n$. $J_{pm,pm}$ represents a surface energy between crystal grains of the parent phase. $J_{pm,pn}$ ($=J_{pn,pm}$) represents a surface energy between a crystal grain of the parent phase and a crystal grain of the new phase. $J_{pn,pn}$ represents a surface energy between crystal grains of the new phase. H is a constant representing a magnitude of an energy at a lattice point. H is a value exceeding 0. θ is a Heaviside function. $Q_u$ is the total number of non-recrystallized grains.

The first term on the right side of the expression (4) represents a grain boundary energy. The grain boundary energy is a driving force for the growth of crystal grains. The first term on the right side of the expression (4) expresses that the closer the lattice point i is to the grain boundary, the larger the grain boundary energy becomes. The second term on the right side of the expression (4) represents a lattice point energy. The lattice point energy is a driving force for nucleation. The lattice point energy takes a value exceeding 0 when the lattice point i exists in the non-recrystallized region, and it takes 0 when the lattice point i exists in the recrystallized region.

The expression (4) is one example of a mathematical expression which expresses the physical phenomenon with which the DP steel is to comply.

(D) When the energy difference $\Delta E$ is less than 0 (in a case of $\Delta E<0$), the orientation $S_i$ of the lattice point i is replaced with the orientation $S_i'$. When the energy difference $\Delta E$ is 0 or more (in a case of $\Delta E \geq 0$), the orientation $S_i$ of the lattice point i is replaced with the orientation $S_i'$ at a transition probability W ($=\Delta E/k_B T$). Here, $k_B$ indicates a Boltzmann constant. T indicates a temperature. It is assumed that the temperature T is previously set.

(E) Out of unselected lattice points, one lattice point i is randomly selected.

(F) The procedures (B) to (E) are performed with respect to the lattice point i selected in the procedure (E).

(G) After the procedure (F) is terminated, the procedures (B) to (D) are performed until when all lattice points i are selected in the procedures (A) and (E).

FIG. 6A to FIG. 6D are views illustrating, in a conceptual manner, a simulation according to the Monte Carlo method using the Potts model. Here, it is assumed that the surface energies $J_{pm,pm}$, $J_{pm,pn}$, $J_{pn,pm}$, $J_{pn,pn}$ are equal ($J_{pm,pm}=J_{pm,pn}=J_{pn,pm}=J_{pn,pn}=J$). Further, it is assumed that the constant H is less than 2J (H<2J). In FIG. 6A to FIG. 6D, a region indicated by gray represents the recrystallized region (new phase). The other white regions represent the non-recrystallized region (parent phase). Further, it is assumed that $1 \leq S_i < Q_u$ means that the lattice point i exists in the parent phase. It is assumed that $Q_u+1 \leq S_i < Q$ means that the lattice point i exists in the new phase.

Figure 6A:
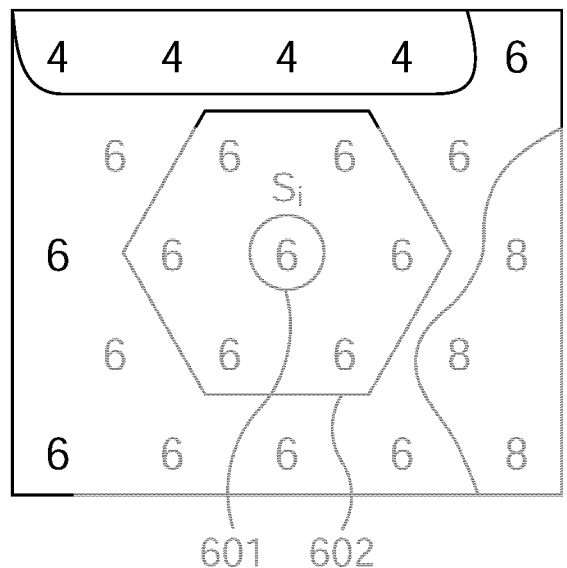
FIG. 6A is a view illustrating the first embodiment and illustrating a first state of a first example of a simulation according to a Monte Carlo method.
Figure 6B:
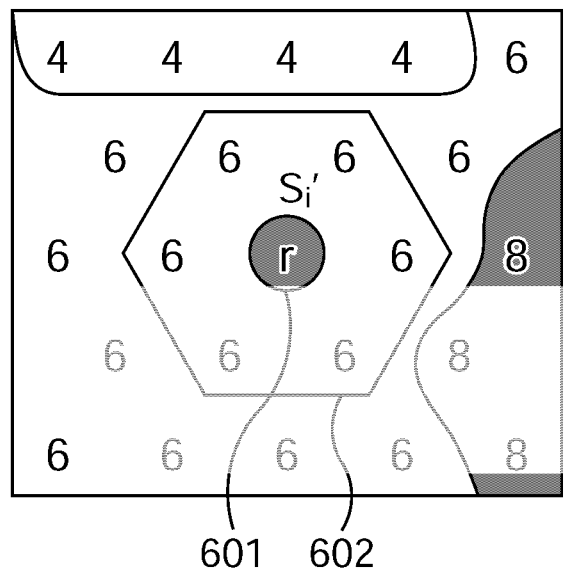
FIG. 6B is a view illustrating the first embodiment and illustrating the second state of the first example of the simulation according to the Monte Carlo method.

In FIG. 6A, it is indicated that a lattice point 601 is selected as the lattice point i (refer to the procedure (A)). As a range of the nearest neighborhood n·n of the lattice point 601, a range 602 is set. The orientation $S_i$ of the lattice point 601 is 6. Therefore, a value r which is different from 6, is selected as the orientation $S_i'$, as illustrated in FIG. 6B (refer to the procedure (B)). In this case, $E(S_i)$ is H according to the expression (4). $E(S_i')$ is $6J_{pm,pn}$ (=6J). Therefore, the energy difference $\Delta E$ becomes 6J–H (refer to the procedure (C)). This energy difference $\Delta E$ takes a positive value (>0). Therefore, the orientation $S_i$ of the lattice point 601 is replaced with the orientation $S_i'$ at a probability of the transition probability W (refer to the procedure (D)).

Figure 6C:
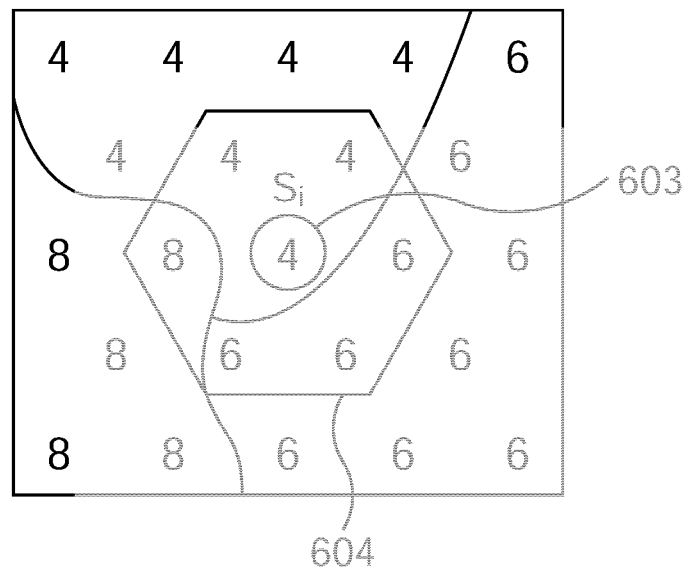
FIG. 6C is a view illustrating the first embodiment and illustrating a first state of a second example of a simulation according to the Monte Carlo method.
Figure 6D:
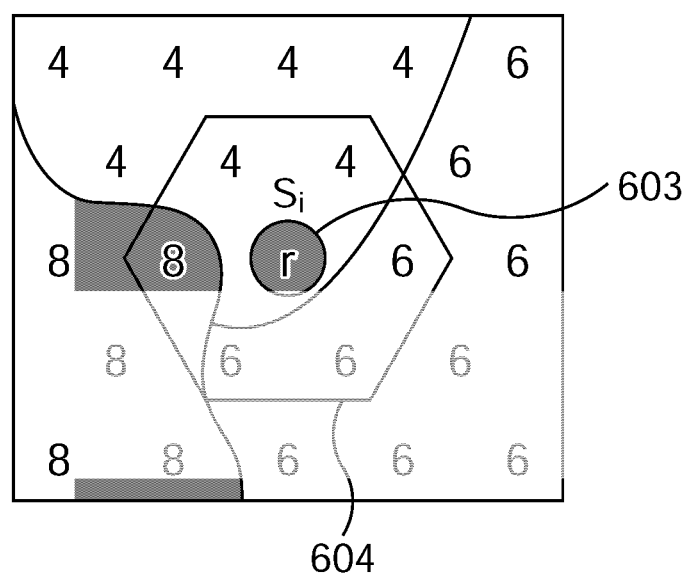
FIG. 6D is a view illustrating the first embodiment and illustrating a second state of the second example of the simulation according to the Monte Carlo method.

In FIG. 6C, it is indicated that a lattice point 603 is selected as the lattice point i (refer to the procedure (A)). As a range of the nearest neighborhood n·n of the lattice point 603, a range 604 is set. The orientation $S_i$ of the lattice point 603 is 4. Therefore, a value r which is different from 4, is selected as the orientation $S_i'$, as illustrated in FIG. 6D (refer to the procedure (B)). In this case, $E(S_i)$ is $J_{pm,pn}+3J_{pm,pn}+H$ (=4J+H) according to the expression (4). $E(S_i')$ is $6J_{pm,pn}$ (=6J). Therefore, the energy difference $\Delta E$ becomes 2J–H (refer to the procedure (C)). This energy difference $\Delta E$ takes a negative value (<0). Therefore, when the value of r is 8, the orientation $S_i$ of the lattice point 603 is changed to 8 (refer to the procedure (D)). Consequently, a crystal grain with an orientation of 8 is grown. On the other hand, when the value of r is a value except for 8, the orientation $S_i$ of the lattice point 603 is changed to a value except for 6 and 8 (refer to the procedure (D)). Accordingly, a new phase (a new crystal grain) is generated in accordance with nucleation.

The above-described simulation is performed on the image 0a of the microstructure by differentiating the surface energies $J_{pm,pm}$, $J_{pm,pn}$, $J_{pn,pm}$, $J_{pn,pn}$ and the constant H between the case where the "coarsening" is performed and the case where the "miniaturization" is performed. Accordingly, the images 1a, 2a of the microstructures are generated. When the above-described simulation is performed by setting the images 1a, 2a of the microstructures as the images of the microstructures being generation sources, the images 3a to 6a of the microstructures are generated. When the above-described simulation is performed by setting the images 3a to 6a of the microstructures as the images of the microstructures being generation sources, the images 7a to 14a of the microstructures are generated. In a similar manner, the images 15a to 30a of the microstructures and the images 31a to 62a of the microstructures are generated. As described above, in the present embodiment, the processing procedure for generating the images 1a to 62a of the microstructures corresponds to the transition function $f(s_{t+1}|s_t, a_t)$.

In the present embodiment, it is assumed that the image 0a of the microstructure does not include a hard phase and is formed only of a soft phase. Therefore, the images 1a to 62a of the microstructures also do not include the hard phase and are formed only of the soft phase. An S-S curve of only the soft phase does not greatly vary depending on the state of the microstructure. Accordingly, in the present embodiment, it is assumed that by further performing the above-described simulation on each of the images 0a to 62a of the microstructures, the images of the microstructures include the hard phase and the soft phase. The images of the microstructures are images of microstructures after a phase transformation. In the present embodiment, the phase transformation is assumed to be an austenite transformation. It is assumed that a region of austenite after being subjected to the phase transformation changes to the hard phase such as martensite.

Figure 7:
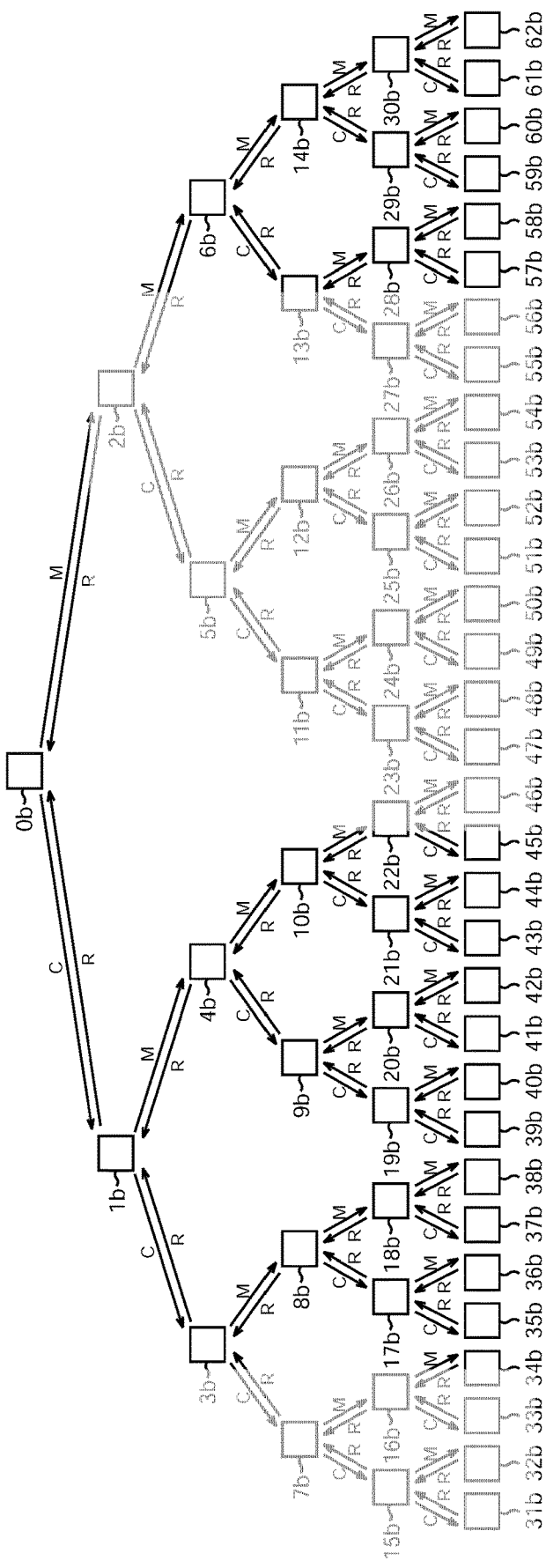
FIG. 7 is a view illustrating the first embodiment and explaining one example of transition of microstructures after a phase transformation.
Figure 8:
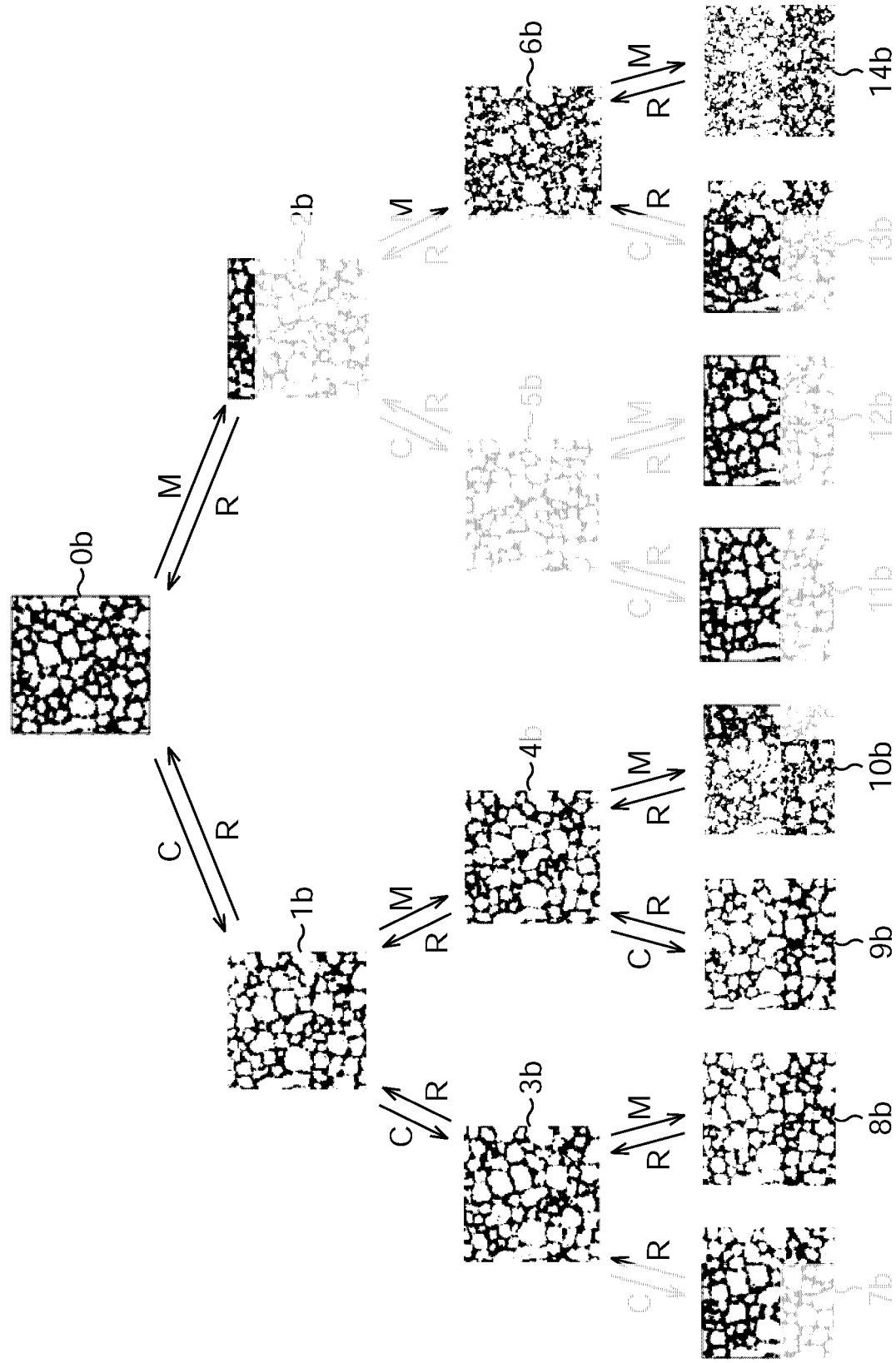
FIG. 8 is a view illustrating the first embodiment and illustrating one example of images of the microstructures after the phase transformation.

FIG. 7 is a view explaining one example of transition of the microstructures after the phase transformation. FIG. 7 is a view corresponding to FIG. 3. From the images of the microstructures with Nos (0a to 62a) illustrated in FIG. 3, images of the microstructures with Nos (0b to 62b) illustrated in FIG. 7 are generated. For example, from the image 0a of the microstructure illustrated in FIG. 3, the image 0b of the microstructure illustrated in FIG. 7 is generated. FIG. 8 is a view illustrating one example of images of microstructures after the phase transformation. FIG. 8 is a view corresponding to FIG. 4. In FIG. 8, only 15 images 0b to 14b of the microstructures out of 63 images 0b to 62b of the microstructures are represented as a matter of convenience of illustration. The illustration of contents of the other images 15b to 63b of the microstructures is omitted.

In FIG. 8, a black region indicates a hard phase. A white region indicates a soft phase. The microstructure after the phase transformation is assumed to be a binarized image. For example, to a voxel (or a pixel) corresponding to a region of the hard phase, a binarized label indicating whether the voxel (or the pixel) is either the soft phase or the hard phase, is given.

When generating the images 0b to 62b of the microstructures illustrated in FIG. 7 and FIG. 8, in the case of changing the value indicating the orientation $S_i$ of the lattice point i, the phase transformation into the austenite phase is assumed to occur as described above in a region where the value is changed, and austenite as a result of the phase transformation is assumed to turn into the hard phase (martensite) through quick cooling. Specifically, in the region where the value is changed, the hard phase is generated as a new phase (a new crystal grain). In the present embodiment, the S-S curve is derived in a manner as described above by using the images 0b to 62b of the microstructures. If proportions of the hard phases included in the images 0b to 62b of the microstructures are different, it is not possible to equally evaluate each of the S-S curves. Accordingly, the proportions of the hard phases (martensite) included in the images 0b to 62b of the microstructures are set to be the same. For example, when the images 0b to 62b of the microstructures are three-dimensional images, voluminal proportions of the hard phases included in the images 0b to 62b of the microstructures are set to be the same. When the images 0b to 62b of the microstructures are two-dimensional images, areal proportions of the hard phases included in the images 0b to 62b of the microstructures are set to be the same. For example, 30% can be adopted as the voluminal proportion and the areal proportion of the hard phase.

The simulation itself based on the Monte Carlo method using the Potts model can be realized by using a well-known technique such as one described in Non Patent Literature 4, for example. The entire contents of Non Patent Literature 4 are incorporated herein by reference.

[Learning Model]

Figure 9:
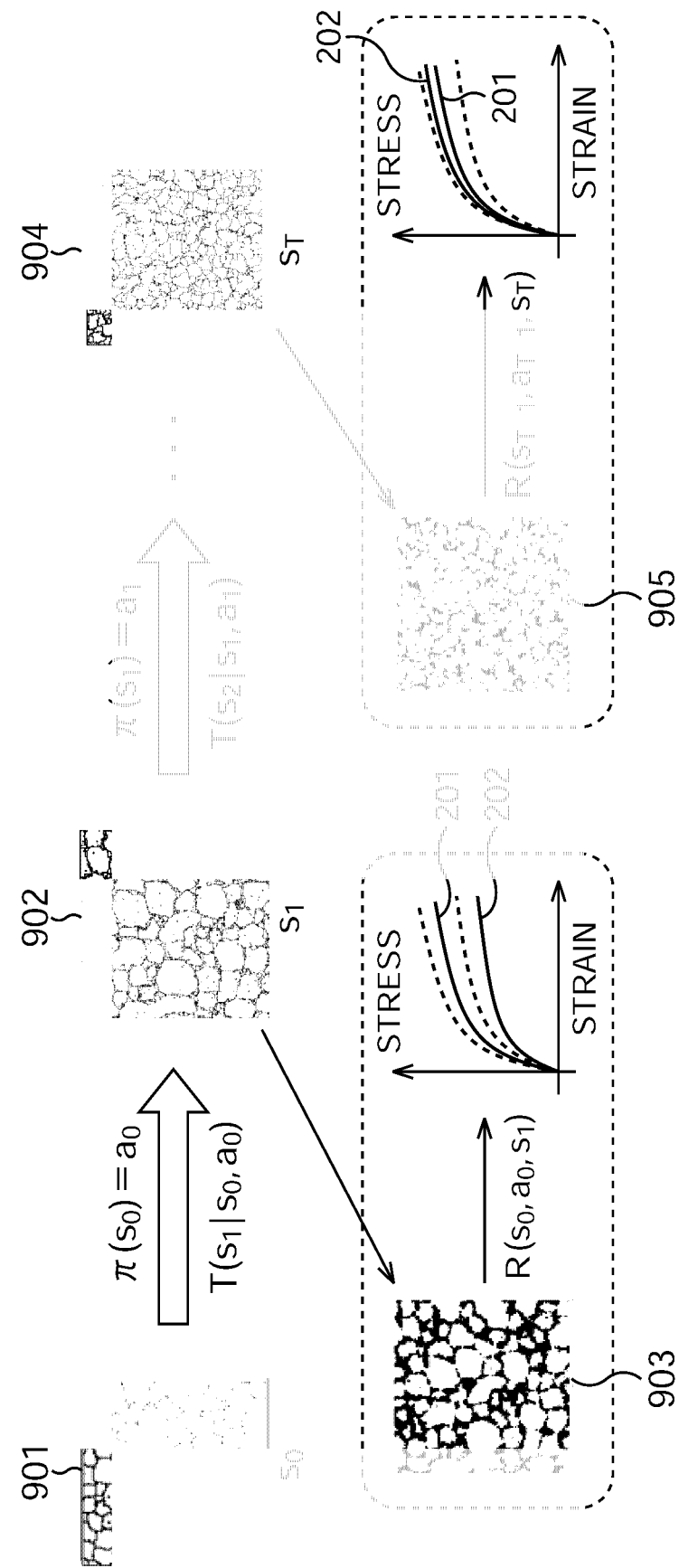
FIG. 9 is a view illustrating the first embodiment and explaining one example of a method of searching for DP steel having a desired mechanical property.

FIG. 9 is a view explaining one example of a method of searching for DP steel having a desired mechanical property.

In FIG. 9, an initial image 901 of a microstructure corresponds to the image 0a of the microstructure illustrated in FIG. 3 and FIG. 4, for example. The initial image 901 of the microstructure corresponds to a state $s_0$ at a time t=0. A policy $\pi(s_0)$ of deciding an action $a_0$ taken by an agent with respect to the initial image 901 of the microstructure is given, and the action $a_0$ according to the policy is taken. The action $a_0$ is either the "coarsening" or the "miniaturization". Consequently, based on the transition function $f(s_1|s_0, a_0)$, the state $s_0$ transits to a state $s_1$ at the next time t=1. In the example illustrated in FIG. 3 and FIG. 4, an image 902 of a microstructure being a transition destination is the image 1a or 2a of the microstructure. The transition is performed so as to satisfy a Markov property. Therefore, a conditional probability distribution of a state $S_{t+1}$ at the next time t+1 depends only on the state $S_t$ at the current time t. This corresponds to the fact that each of the images 1a to 62a of the microstructures is generated based only on the image positioned at the starting point of the arrow line of C or the arrow line of M extending toward each of the images in FIG. 3 and FIG. 4.

When the image of the microstructure is transited from the initial image 901 of the microstructure to the image 902 of the microstructure, an image 903 of a microstructure after a phase transformation is generated from the image 902 of the microstructure. When the image 902 of the microstructure is the image 1a of the microstructure, the image 1b of the microstructure after the phase transformation is generated. From the image 903 of the microstructure after the phase transformation, an S-S curve 202 is derived.

A value of the reward function r (immediate reward) varies depending on whether or not a difference between the aimed S-S curve 201 and the S-S curve 202 falls within a predetermined range. In the present embodiment, when the difference between the aimed S-S curve 201 and the S-S curve 202 does not fall within the predetermined range, the value of the reward function r (immediate reward) is set to 0. When the difference between the aimed S-S curve 201 and the S-S curve 202 falls within the predetermined range, the value of the reward function r (immediate reward) is set to 1. The aimed S-S curve 201 is set to σ*, and the S-S curve 202 is set to $\sigma_s$. An index as a result of digitizing a distance between the aimed S-S curve 201 and the S-S curve 202 is set to d (σ*, $\sigma_s$). As the index, Euclidean norm is used, for example. A threshold value with respect to the distance between the aimed S-S curve 201 and the S-S curve 202 is set to E. Consequently, the reward function $r(s_t, a_t, s_{t+1})$ is expressed by the following expression (5).

[Mathematical expression 5]

$$r(s_t, a_t, s_{t+1}) = \begin{cases} 0, & d(\sigma^*, \sigma_s) > \varepsilon \\ 1, & d(\sigma^*, \sigma_s) \leq \varepsilon \end{cases} \quad (5)$$

In the example illustrated in FIG. 9, the predetermined range with respect to the aimed S-S curve 201 is indicated by a dotted line. Therefore, the difference between the aimed S-S curve 201 and the S-S curve 202 derived from the image 1b of the microstructure after the phase transformation does not fall within the predetermined range. Consequently, a reward function $r(s_0, a_0, s_1)$ indicates 0.

After that, a reward function $r(s_2, a_1, s_2)$ is derived by setting the image 902 of the microstructure as the image of the microstructure being the transition source. Subsequently, an accumulated value of the reward function r (=$r(s_0, a_0, s_1)$+$r(s_2, a_1, s_2)$) is derived as a cumulative reward.

In a manner as described above, the image of the microstructure being the transition source is sequentially changed so as to satisfy the Markov property until when the difference between the aimed S-S curve 201 and the S-S curve 202 falls within the predetermined range. In FIG. 9, it is indicated that at a state $S_T$, the difference between the aimed S-S curve 201 and the S-S curve 202 falls within the predetermined range. In the present embodiment, the immediate reward (reward function $r(s_{T-1}, a_{T-1}, s_T)$) takes 1 in accordance with the expression (5) at this time.

The image of the microstructure having the maximum cumulative reward is searched for as described above. In the present embodiment, an image 904 of a microstructure having the immediate reward of 1 is searched for. Therefore, the searching for the image 904 of the microstructure having the maximum cumulative reward, is the same as the searching for the image of the microstructure regarding which the reward function $r(s_{t-1}, a_{t-1}, s_t)$ takes 1. Note that in FIG. 9, an image 905 of a microstructure after a phase transformation is generated from the image 904 of the microstructure having the immediate reward of 1.

Information including the initial image 901 of the microstructure, the image 904 of the microstructure having the immediate reward of 1, and information obtained by arranging actions $a_t$ until when the image 904 of the microstructure having the immediate reward of 1 is obtained from the initial image 901 of the microstructure, in the order of the performance of the actions, is generated. In the following explanation, this information is referred to as production process information according to need.

Figure 10:
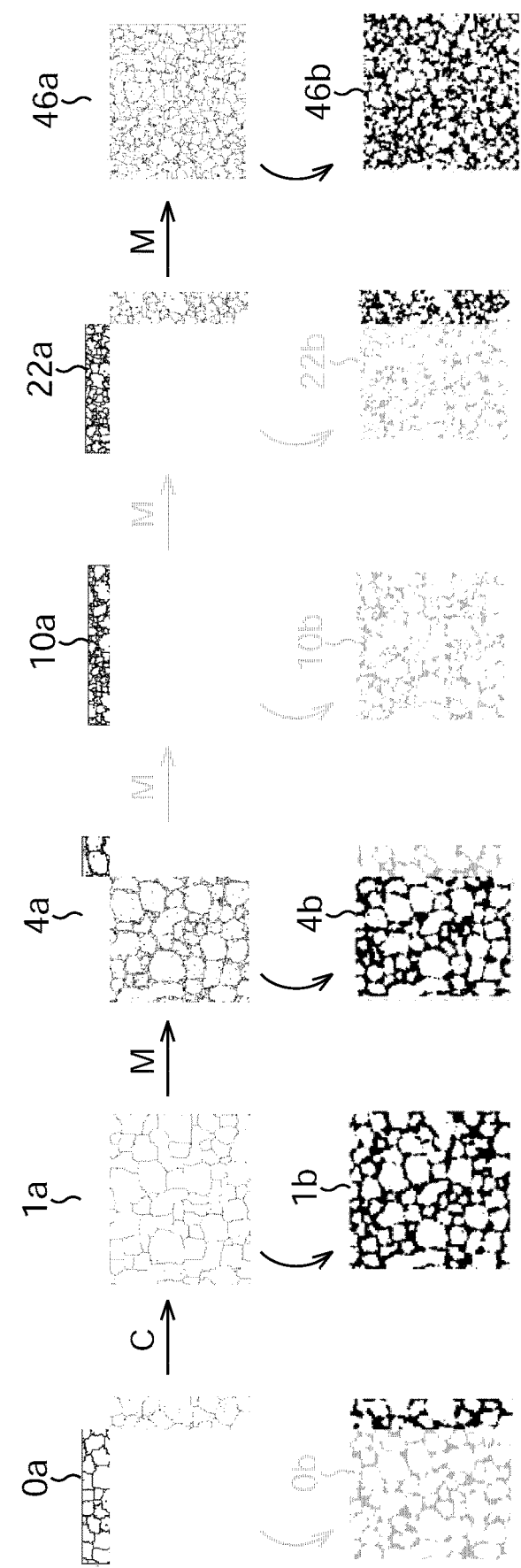
FIG. 10 is a view illustrating the first embodiment and illustrating a process through which a final image of the microstructure is obtained from an initial image of the microstructure.

The performance of the "coarsening" and the "miniaturization" with respect to the image of the microstructure corresponds to setting of a heat treatment condition in a heat treatment process. Therefore, the production process information becomes information to be a guideline for a condition of temperature control for producing DP steel having a desired S-S curve. For example, the initial image 901 of the microstructure is assumed to be the image 0a of the microstructure illustrated in FIG. 3. The image of the microstructure having the immediate reward of 1 is assumed to be the image 46a of the microstructure illustrated in FIG. 3. Until when the image 46a of the microstructure is obtained from the image 0a of the microstructure, the images of the microstructures being the transition sources are assumed to transit in the order of 0a→1a→4a→10a→22a. In this case, it can be understood that it is only required to employ a heat treatment condition satisfying "coarsening"→"miniaturization" →"miniaturization"→"miniaturization"→"miniaturization". FIG. 10 illustrates a process through which the image 46a of the microstructure is obtained from the image 0a of the microstructure. In a manner as described above, one of the policies π is searched for.

In the present embodiment, a learning model is used for deriving the optimum policy *. The learning model is for searching for a state of a microstructure having an immediate reward of 1, when an initial state of a microstructure is given. The learning model is created by performing reinforcement learning. In the present embodiment, a case where Q-learning is used as one example of the reinforcement learning, is cited as an example.

A procedure for deriving the optimum policy * will be described. Based on the expression (1), an action value function $Q^\pi(s, a)$ is defined as in the following expression (6). Note that in this case, an immediate reward when a policy π(s) is taken in a state s, is described as r(s, π(s)). Further, a transition function when the policy π(s) is taken in the state s, is described as f(s, π(s))

[Mathematical expression 6]

$$Q^\pi(s, a) := \left\{ \sum_{t=0}^{t\infty} \gamma^t r(s_t, \pi(s_t)) \,\middle|\, s_0 = s, a_0 = a, s_{t+1} = f(s_t, \pi(s_t)), a_t = \pi(s_t) \right\} \quad (6)$$

An optimum action value function $Q^*(s, a)$ that maximizes the action value function $Q^\pi(s, a)$ is defined as in the following expression (7). Here, a set M of policies is defined as in the following expression (8).

[Mathematical expression 7]

$$Q^*(s, a) := \max_{\pi \in M} Q^\pi(s, a), \forall (s, a) \in S \times A \quad (7)$$

$$M := \{\pi : S \to A \mid \pi(s) \in A(s)\} \quad (8)$$

S is a finite set of states s. In the example illustrated in FIG. 3, the number of the states s is 63 (the images 0a to 62a of the microstructures). Namely, N of the finite set S of the states s (={$s^1, s^2, \ldots, s^N$}) is 63. A is a finite set of actions a. In the example illustrated in FIG. 3, the number of the actions a is 3 ("coarsening", "miniaturization", "return"). Specifically, K of the finite set A of the actions a (={$a^1, a^2, \ldots, a^K$}) is 3 When the expression (6) is substituted into the expression (7), the following expression (9) is obtained.

[Mathematical expression 8]

$$Q^*(s, a) = r(s, a) + \gamma \max_{a' \in A} Q^*(s', a') \quad (9)$$

The expression (9) is called a Bellman equation. Here, s'=f(s, a). When a function F:F→F that acts on the optimum action value function Q* is defined as in the following expression (10), the Bellman equation of the expression (8) is represented as in the following expression (11).

[Mathematical expression 9]

$$(FQ^*)(s, a) := r(s, a) + \gamma \max_{a' \in A} Q^*(s', a') \quad (10)$$

$$Q^*(s, a) = FQ^*(s, a) \quad (11)$$

The expression (11) is a problem that decides a fixed point Q*. As a solution algorithm of the expression (11), Mann iteration can be used, for example. In this case, convergence to a fixed point is realized according to the following expression (12). k is the number of times of trial of the policy π until when the optimum policy π* is obtained, and is a positive integer.

[Mathematical expression 10]

$$Q_{k+1}(s,a) = Q_k(s,a) + \alpha_k(FQ_k(s,a) - Q_k(s,a)), \forall (s,a) \in S \times A \quad (12)$$

In the expression (12), a search space of solution is ∀(s, a). In the Q-learning, the search space of solution is limited to a range satisfying a relationship of the following expression (13).

[Mathematical expression 11]

$$s_{k+1} = f(s_k, a_k) \quad (13)$$

By giving the condition of the expression (13) to derive the solution of the expression (12), a Q-table is created. The Q-table is a matrix with a size of S×A formed of a pair (s, a)∈S×A, the pair being formed of elements of the finite set S of the states s (states s) and elements of the finite set A of the actions a (actions a). A Q value is set to each element in the Q-table.

Figure 11A:
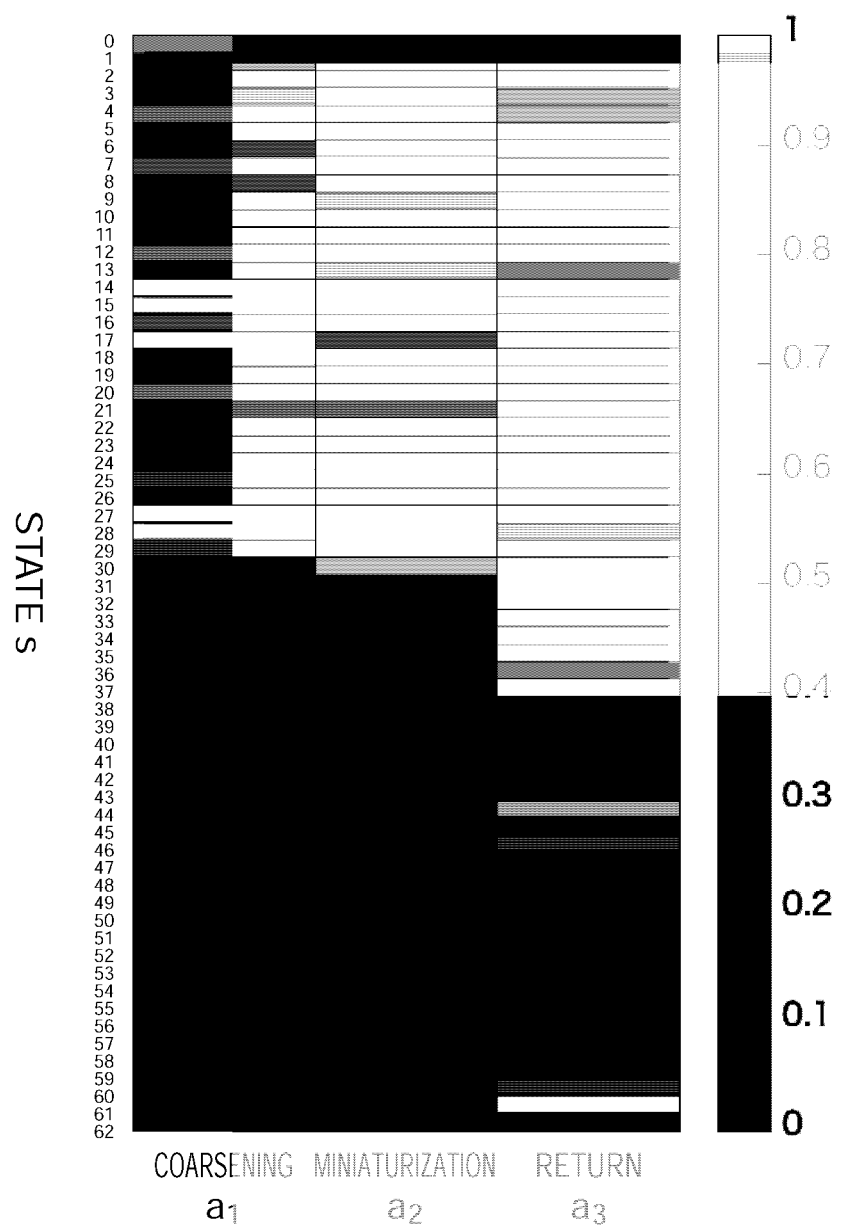
FIG. 11A is a view illustrating the first embodiment and illustrating one example of an initial Q-table.

FIG. 11A is a view illustrating one example of an initial Q-table. In the present embodiment, the actions a are "coarsening $a_1$", "miniaturization $a_2$", and "return $a_3$". The states s are states of the images 0a to 62a of the microstructures. Therefore, the Q-table is a matrix of 63 rows and 3 columns. In FIG. 11A, a number denoted as the state corresponds to each of the images 0a to 62a of the microstructures illustrated in FIG. 3. For example, in FIG. 11A, the state 0 corresponds to the state of the image 0a of the microstructure illustrated in FIG. 3. Further, in the example illustrated in FIG. 3, the "return $a_3$" cannot be selected with respect to the image 0a of the microstructure. Accordingly, the Q value of the "return" in the state 0 (first row) of the Q-table is fixed by 0. The "coarsening at" and the "miniaturization $a_2$" cannot be selected with respect to the images 31a to 62a of the microstructures. Accordingly, the Q value of the "coarsening $a_1$" and the "miniaturization $a_2$" in each of the states 31 to 62 (32nd row to 61st row) of the Q-table is fixed by 0.

The Q-table is initialized when the number of times of trial k is 0 (k=0). In the present embodiment, a Q value (Q(s, a)) of each element in the initial Q-table is set by uniform random numbers in a range of 0 or more and 1 or less.

A Q-table derived at the number of times of trial k−1 in the number of times of trial k (k>0) is used. When the number of times of trial k is 1, the initial Q-table is used. In the Q-table derived at the number of times of trial k−1, Q values (Q(s', $a_1$), Q(s', $a_2$), Q(s', $a_3$)) are referred to. s' indicates a state after transition. In the present embodiment, the state s transits as illustrated in FIG. 3, so that the state s' after the transition is determined. $a_1, a_2, a_3$ are elements of the finite set A of the actions a. Here, $a_1$ indicates the "coarsening". $a_2$ indicates the "miniaturization". $a_3$ indicates the "return". The Q values (Q(s', $a_1$), Q(s', $a_2$), Q(s', $a_3$)) are determined based on a maximum value out of Q values (Q(s, $a_1$), Q(s, $a_2$), Q(s, $a_3$)).

For example, the initial image 901 of the microstructure is assumed to be the image 0a of the microstructure. Out of Q values (Q(0, $a_1$), Q(0, $a_2$), Q(0, $a_3$)) in the state 0 (first row), a maximum value is Q(0, $a_2$). In this case, from FIG. 3, the state s' after the transition is the state 1 (the image 2a of the microstructure). Therefore, Q values (Q(2, $a_1$), Q(2, $a_2$), Q(2, $a_3$)) in the state 2 (third row) in FIG. 11A are referred to.

Next, in accordance with the expression (10), by setting the maximum Q value out of the Q values (Q(s', $a^1$), Q(s', $a_2$), Q(s', $a_3$)) as $FQ_k$(s, a), the Q value is updated according to the expression (12). For example, the maximum value out of the Q values (Q(0, $a_1$), Q(0, $a_2$), Q(0, $a_3$)) in the state 0 (first row) is Q(0, $a_2$). In this case, a state next to the state 0 is the state 2 (the image 2a of the microstructure) obtained when the transition occurs by performing the "miniaturization" on the state 0 (the image 0a of the microstructure). In this case, the Q value (Q(0, $a_2$)) becomes a target of update.

Further, the maximum value out of the Q values (Q(2, $a_1$), Q(2, $a_2$), Q(2, $a_3$)) is Q(2, $a_3$). In this case, when the calculation of the expression (12) is performed by setting the Q value (Q(2, $a_3$)) to $FQ_k$(s, a), a Q value ($Q_{k+1}$(0, $a_2$)) at the number of times of trial k+1 is derived. The value of the Q value (Q(0, $a_2$)) is updated to the Q value derived as described above.

The update of the Q value in the Q-table in a manner as described above is repeatedly performed until when the image of the microstructure having the immediate reward of 1 is obtained. When the image of the microstructure having the immediate reward of 1 is obtained, the Q value (Q(s, a)) in the Q-table corresponding to the state of the image of the microstructure is updated as follows. The first term on the right side in the expression (10) (the immediate reward r(s, a)) is set to 1. The second term on the right side in the expression (10) is set to 0. When the calculation of the expression (12) is performed by using $FQ_k$(s, a) obtained as described above, a Q value ($Q_{k+1}$(s, a)) is derived. The value of the Q value (Q(s, a)) is updated to the Q value derived as described above. In the example illustrated in FIG. 10, a value of a Q value (Q(46, $a_1$)) in the state 46 (47th row) is updated.

By updating the Q value in the Q-table in a manner as described above until when the image of the microstructure having the immediate reward of 1 is obtained, learning of one time (trial with the number of times of trial k) is terminated. The Q-table at a point of time where the learning of one time is terminated is used to update the Q-table in the same manner as described above, thereby terminating the next learning (trial with the number of times of trial k+1). Note that in the respective performances of the learning, the initial image 901 of the microstructure is fixed (fixed to the image 0a of the microstructure in the example illustrated in FIG. 3). Such learning is repeatedly conducted until when a predetermined convergence condition is satisfied.

Figure 12:
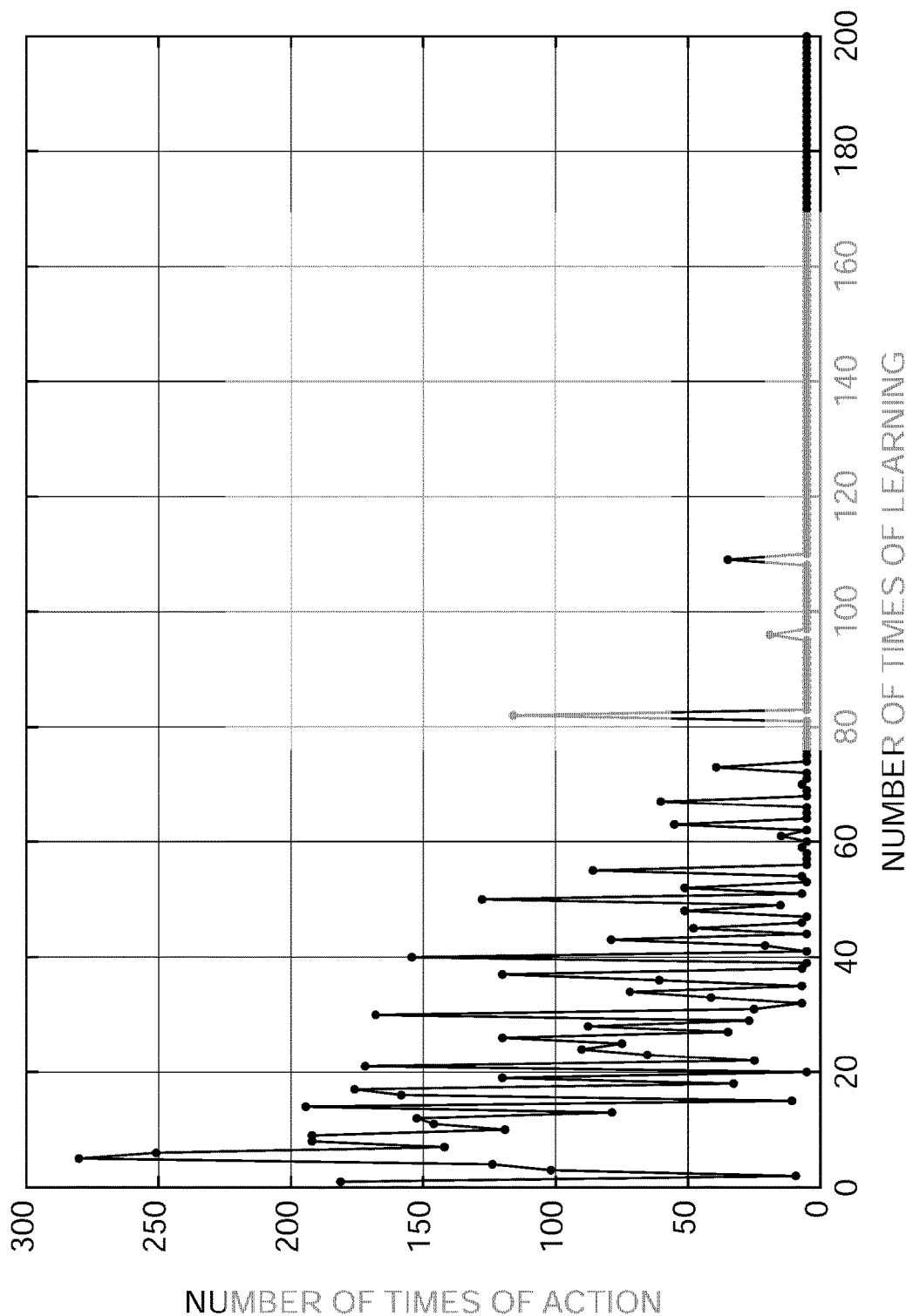
FIG. 12 is a view illustrating the first embodiment and illustrating one example of a state where learning is converged.

FIG. 12 is a view illustrating one example of a state where the learning is converged. In FIG. 12, the number of times of actions is the number of times of actions (transition of states) until when the image of the microstructure having the immediate reward of 1 is obtained. For example, it is indicated that in the first learning, the image of the microstructure having the immediate reward of 1 is obtained by performing actions of about 180 times. When the number of times of learning becomes about 120, the number of times of actions is converged to 5. As the predetermined convergence condition, it is possible to employ a condition under which even if a predetermined number of times of learning is performed, a result of the learning (production process information) does not change.

Figure 11B:
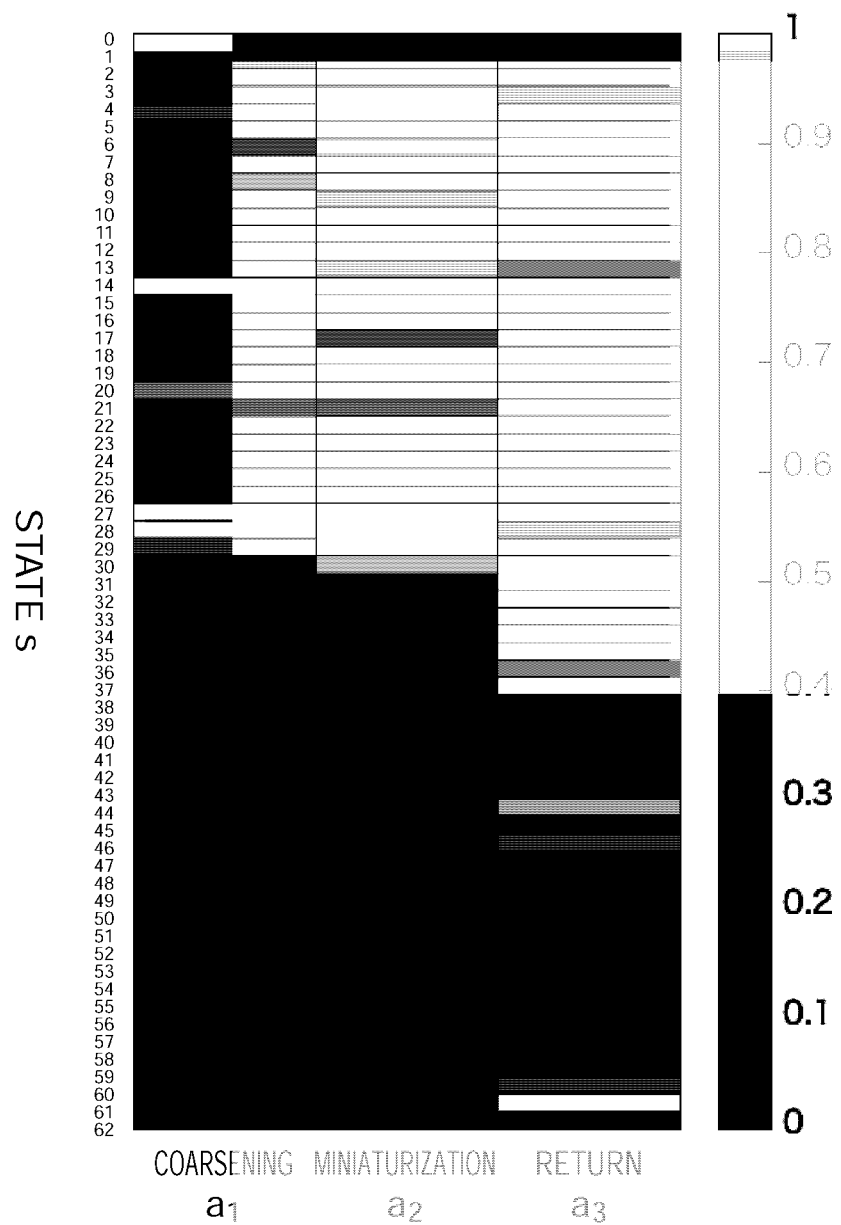
FIG. 11B is a view illustrating the first embodiment and illustrating one example of a Q-table after learning.

The Q-table is created as described above. FIG. 11B is a view illustrating one example of the Q-table after the learning.

[Analysis Apparatus 1300]

Figure 13:
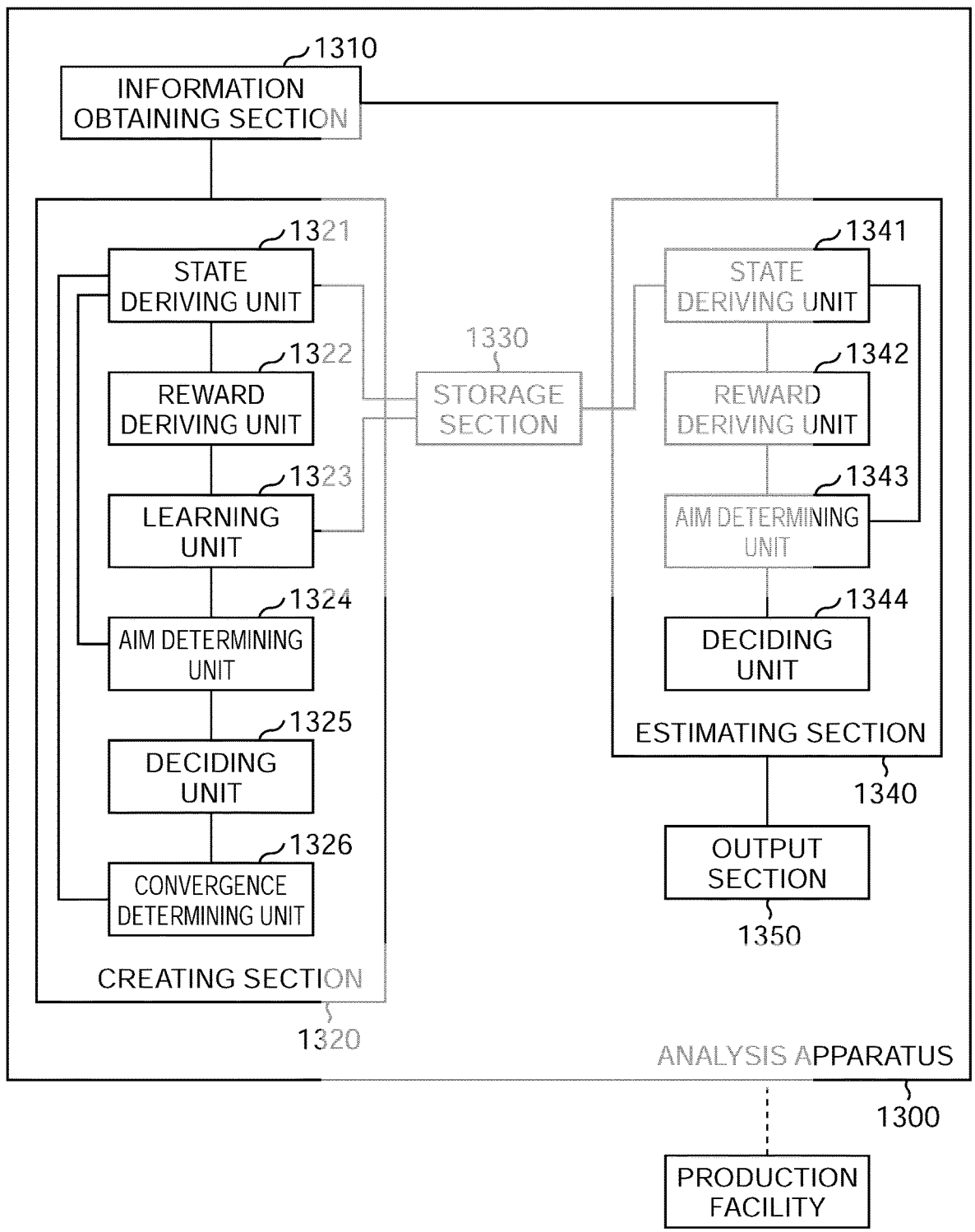
FIG. 13 is a view illustrating the first embodiment and illustrating a first example of a functional configuration of an analysis apparatus.

The above is the explanation regarding the factors. In the present embodiment, an analysis apparatus 1300 is configured by using techniques regarding the respective factors. Hereinafter, one example of the analysis apparatus 1300 of the present embodiment will be described. FIG. 13 is a view illustrating one example of a functional configuration of the analysis apparatus 1300.

<Information Obtaining Section 1310>

An information obtaining section 1310 obtains information regarding the initial image 901 of the microstructure of the DP steel being the analysis target and the aimed S-S curve 201. Information regarding the initial image 901 of the microstructure and the aimed S-S curve 201 output to a creating section 1320, and information regarding the initial image 901 of the microstructure and the aimed S-S curve 201 output to an estimating section 1340 are different. The information regarding the initial image 901 of the microstructure and the aimed S-S curve 201 output to the creating section 1320, is for creating the Q-table. The information regarding the initial image 901 of the microstructure and the aimed S-S curve 201 output to the estimating section 1340, is with respect to DP steel being an estimation target of a microstructure. The information regarding the initial image 901 of the microstructure and the aimed S-S curve 201 is obtained through communication with an external device, for example.

<Creating Section 1320, Storage Section 1330>

The creating section 1320 creates the Q-table. The creating section 1320 has a state deriving unit 1321, a reward deriving unit 1322, a learning unit 1323, an aim determining unit 1324, a deciding unit 1325, and a convergence determining unit 1326. The storage section 1330 stores the Q-table. The Q-table is one example of a learning model. Here, explanation will be made by assuming that the initial Q-table is previously stored in the storage section 1330.

<<State Deriving Unit 1321>>

The state deriving unit 1321 is a first deriving unit. The state deriving unit 1321 sets an image of a microstructure being a processing target. In a first setting, the state deriving unit 1321 sets the initial image 901 of the microstructure output from the information obtaining section 1310 as the image of the microstructure being the processing target. In a setting of second time and thereafter, the state deriving unit 1321 sets an image of a microstructure after a transition of the image of the microstructure being the nearest processing target, as the image of the microstructure being the processing target.

The state deriving unit 1321 corresponds to the agent in the Markov decision processes. The state deriving unit 1321 refers to the Q-table in the middle of learning, to derive contents of transition (action) of the state with respect to the image of the microstructure being the processing target. Consequently, the next state of the image of the microstructure being the processing target is determined. The image of the microstructure corresponds to the cause in the inverse problem. The contents of transition (action) of the state is any one of the "coarsening", the "miniaturization", and the "return". In the present embodiment, it is assumed that the state of the image of the microstructure is previously determined to transit in a manner as illustrated in FIG. 3. Therefore, there is no chance that the "return" is derived in the state of the image 0a of the microstructure. In the states of the images 31a to 62a of the microstructures, there is no chance that the "coarsening" and the "miniaturization" are derived.

Further, in the present embodiment, the image 0a of the microstructure is assumed to be used as the initial image 901 of the microstructure in the creating section 1320. Further, in the present embodiment, it is assumed that the images 1a to 62a of the microstructures except for the image 0a of the microstructure are derived every time in the state deriving unit 1321. However, the images 1a to 62a of the microstructures may also be previously derived to be stored in the storage section 1330. In this case, the state deriving unit 1321 derives the images 1a to 62a of the microstructures by searching for the images 1a to 62a of the microstructures.

For example, in FIG. 11A, the maximum value out of the Q values ($Q(0, a_1)$, $Q(0, a_2)$, $Q(0, a_3)$) in the state 0 (first row) is $Q(0, a_1)$. In this case, the contents of transition (action) of the state with respect to the state 0 (the image 0a of the microstructure) becomes the "coarsening".

The state deriving unit 1321 makes the state of the image of the microstructure being the processing target transit in accordance with the contents of transition (action) of the state derived in a manner as described above. Consequently, the image of the microstructure after the transition is derived. The state deriving unit 1321 performs, for example, the "coarsening" on the state 0 (the image 0a of the microstructure), to thereby derive the state 1 to be transited (the image 1a of the microstructure). In the present embodiment, the state deriving unit 1321 performs the simulation based on the Monte Carlo method using the Potts model, thereby deriving the image of the microstructure.

The state deriving unit 1321 derives an image of a microstructure after a phase transformation from the image of the microstructure derived in a manner as described above. The state deriving unit 1321 derives the image 1b of the microstructure after the phase transformation from the image 1a of the microstructure, for example. In the present embodiment, the images 0b to 62b of the microstructures after the phase transformation are assumed to be derived every time in the state deriving unit 1321. However, the images 0b to 62b of the microstructures after the phase transformation may also be previously derived to be stored in the storage section 1330. Note that the state deriving unit 1321 derives the images 0b to 62b of the microstructures after the phase transformation by searching for the images 0b to 62b of the microstructures after the phase transformation. For example, the state deriving unit 1321 derives an image of a microstructure after a phase transformation of the initial image 901 of the microstructure, at a point of time where the initial image 901 of the microstructure is input thereto. In the present embodiment, the state deriving unit 1321 performs the simulation based on the Monte Carlo method using the Potts model, thereby deriving the image of the microstructure after the phase transformation.

<<Reward Deriving Unit 1322>>

The reward deriving unit 1322 is a second deriving unit. The reward deriving unit 1322 derives an S-S curve from the image of the microstructure after the phase transformation. In the present embodiment, the reward deriving unit 1322 uses the homogenization method to derive the S-S curve 202. The S-S curve corresponds to the result in the inverse problem. In the present embodiment, the S-S curve is assumed to be derived every time in the reward deriving unit 1322. However, the S-S curve may also be previously derived to be stored in the storage section 1330. In this case, the reward deriving unit 1322 derives the S-S curve by searching for the S-S curve.

<<Learning Unit 1323>>

The learning unit 1323 updates a Q value of an element determined by the state corresponding to the image of the microstructure being the processing target (row) and the action corresponding to the contents of transition of the state derived by the state deriving unit 1321 (column), out of elements in the Q-table. At this time, the learning unit 1323 performs the calculation of the expression (12) by setting the maximum value of the Q values of the element, out of the elements in the Q-table, determined by the state corresponding to the image of the microstructure derived by the state deriving unit 1321 (row), to $FQ_k(s, a)$, to thereby derive the updated Q value.

For example, it is assumed that the state deriving unit 1321 derives the image 1a of the microstructure from the image 0a of the microstructure. Further, the maximum value in the Q values ($Q(1, a_1)$, $Q(1, a_2)$, $Q(1, a_3)$) is $Q(1, a_2)$. In this case, when the calculation of the expression (12) is performed by setting the Q value ($Q(1, a_2)$) to $FQ_k(s, a)$, the updated Q value ($Q_{k+1}(0, a_1)$) is derived.

<<Aim Determining Unit 1324>>

The aim determining unit 1324 determines whether or not a difference between the aimed S-S curve 201 and the S-S curve 202 derived by the reward deriving unit 1322 falls within a predetermined range. In the present embodiment, the aim determining unit 1324 determines whether or not an index $d(\sigma^*, \sigma_s)$ obtained by digitizing a distance between the aimed S-S curve 201 and the S-S curve 202, is below a threshold value $\varepsilon$.

As a result of the determination made by the aim determining unit 1324, it is assumed that the difference between the aimed S-S curve 201 and the S-S curve 202 derived by the reward deriving unit 1322 does not fall within the predetermined range. In this case, the state deriving unit 1321 updates the number of times t of the transition of the image of the microstructure, to thereby re-set the image of the microstructure being the processing target. As described above, the state deriving unit 1321 re-sets the image of the microstructure as a result of making the state of the image of the microstructure being the processing target transit, as the image of the microstructure being the processing target. For example, it is assumed that the image 1a of the microstructure is derived from the image 0a of the microstructure. In this case, the state deriving unit 1321 re-sets the image 1a of the microstructure as the image of the microstructure being the processing target.

The state deriving unit 1321, the reward deriving unit 1322, the learning unit 1323, and the aim determining unit 1324 repeatedly perform the above-described processing with respect to the re-set image of the microstructure being the processing target, until when the difference between the aimed S-S curve 201 and the S-S curve 202 falls within the predetermined range.

<<Deciding Unit 1325>>

The deciding unit 1325 is activated when the aim determining unit 1324 determines that the difference between the aimed S-S curve 201 and the S-S curve 202 falls within the predetermined range. The deciding unit 1325 decides the state of the microstructure specified from the image of the microstructure being the processing target at a point of time where the aim determining unit 1324 determines that the difference between the aimed S-S curve 201 and the S-S curve 202 falls within the predetermined range, as the state of the microstructure realizing the aimed S-S curve 201. In the explanation hereinbelow, the image of the microstructure being the processing target at a point of time where the aim determining unit 1324 determines that the difference between the aimed S-S curve 201 and the S-S curve 202 falls within the predetermined range, is referred to as a final image of the microstructure according to need. In the example illustrated in FIG. 10, the image 46a of the microstructure is the final image of the microstructure.

The deciding unit 1325 generates the production process information realizing the aimed S-S curve 201. As described above, the production process information includes the initial image 901 of the microstructure, the final image of the microstructure, and the information obtained by arranging the contents of transition (actions) of the states until when the final image of the microstructure is obtained from the initial image 901 of the microstructure, in the order of the performance of the transition. In the example illustrated in FIG. 10, information indicating that "coarsening", "miniaturization", "miniaturization", and "miniaturization" are performed in this order until when the image 46a of the microstructure is obtained from the image 0a of the microstructure, corresponds to the production process information. As described above, the deciding unit 1325 decides the contents of transition (actions) of the states until when the final image of the microstructure is obtained from the initial image 901 of the microstructure.

<<Convergence Determining Unit 1326>>

The convergence determining unit 1326 is activated when the deciding unit 1325 decides the final image of the microstructure. At a timing at which the final image of the microstructure is decided by the deciding unit 1325, the learning of one time of the Q-table is terminated. The convergence determining unit 1326 determines whether or not the predetermined convergence condition is satisfied. As described above, it is possible to employ, as the predetermined convergence condition, a condition under which even if a predetermined number of times of learning is performed, a result of the learning (production process information) does not change. When the predetermined number of times is increased, reliability of the Q-table becomes high. However, when the predetermined number of times is excessively increased, a calculation time becomes long. The predetermined number of times can be set based on such a point of view, for example.

It is assumed that the convergence determining unit 1326 determines that the predetermined convergence condition is not satisfied. In this case, the state deriving unit 1321 returns the image of the microstructure being the processing target to the initial image 901 of the microstructure. The state deriving unit 1321, the reward deriving unit 1322, the learning unit 1323, the aim determining unit 1324, the deciding unit 1325, and the convergence determining unit 1326 repeatedly perform the above-described processing until when the predetermined convergence condition is satisfied. The update (learning) of the Q-table stored in the storage section 1330 is terminated at a timing at which the convergence determining unit 1326 determines that the predetermined convergence condition is satisfied. The storage section 1330 stores the Q-table after terminating the learning.

<Estimating Section 1340>

The estimating section 1340 estimates, with the use of the Q-table after the learning, the contents of transition (actions) until when the final image of the microstructure is obtained from the initial image 901 of the microstructure. The estimating section 1340 has a state deriving unit 1341, a reward deriving unit 1342, an aim determining unit 1343, and a deciding unit 1344.

<<State Deriving Unit 1341>>

The state deriving unit 1341 is a first deriving unit. The state deriving unit 1341 has a function same as that of the state deriving unit 1321. Therefore, detailed explanation of the function of the state deriving unit 1341 will be omitted. However, in the estimating section 1340, as the information regarding the initial image 901 of the microstructure and the aimed S-S curve 201, one with respect to DP steel being an estimation target of a microstructure is used. The initial image 901 of the microstructure is not limited to the image 0a of the microstructure. The initial image 901 of the microstructure may be any of the images 0a to 62a of the microstructures. Further, the state deriving unit 1341 refers to the Q-table after the learning, to thereby derive the contents of transition (action) of the state with respect to the image of the microstructure being the processing target.

In the present embodiment, it is assumed that the state deriving unit 1341 also derives the image of the microstructure and the image of the microstructure after the phase transformation every time, similarly to the state deriving unit 1321. However, the image of the microstructure and the image of the microstructure after the phase transformation may also be previously derived to be stored in the storage section 1330. The state deriving unit 1341 corresponds to the agent in the Markov decision processes.

<<Reward Deriving Unit 1342>>

The reward deriving unit 1342 is a second deriving unit. The reward deriving unit 1342 has a function same as that of the reward deriving unit 1322. The reward deriving unit 1342 uses the homogenization method to derive the S-S curve from the image of the microstructure after the phase transformation. In the present embodiment, it is assumed that the reward deriving unit 1342 also derives the S-S curve every time, similarly to the reward deriving unit 1322. However, the S-S curve may also be previously derived to be stored in the storage section 1330.

<<Aim Determining Unit 1343>>

The aim determining unit 1343 has a function same as that of the aim determining unit 1324. The aim determining unit 1343 determines whether or not a difference between the aimed S-S curve 201 and the S-S curve 202 derived by the reward deriving unit 1342 falls within a predetermined range.

As a result of the determination made by the aim determining unit 1343, it is assumed that the difference between the aimed S-S curve 201 and the S-S curve 202 derived by the reward deriving unit 1342 does not fall within the predetermined range. In this case, the state deriving unit 1341 re-sets the image of the microstructure being the processing target. The state deriving unit 1341 re-sets the image of the microstructure obtained by making the state of the image of the microstructure being the nearest processing target transit, as the image of the microstructure being the processing target, similarly to the state deriving unit 1321.

The state deriving unit 1341, the reward deriving unit 1342, and the aim determining unit 1343 repeatedly conduct the above-described processing with respect to the re-set image of the microstructure being the processing target, until when the difference between the aimed S-S curve 201 and the S-S curve 202 falls within the predetermined range.

<<Deciding Unit 1344>>

The deciding unit 1344 is activated when the aim determining unit 1343 determines that the difference between the aimed S-S curve 201 and the S-S curve 202 falls within the predetermined range. The deciding unit 1344 has a function same as that of the deciding unit 1325. The final image of the microstructure is the image of the microstructure being the processing target at a point of time where the aim determining unit 1343 determines that the difference between the aimed S-S curve 201 and the S-S curve 202 falls within the predetermined range.

The deciding unit 1344 derives the production process information realizing the aimed S-S curve 201. As described above, the production process information includes the initial image 901 of the microstructure, the final image of the microstructure, and the information obtained by arranging the contents of transition (actions) of the states until when the final image of the microstructure is obtained from the initial image 901 of the microstructure, in the order of the performance of the transition. As described above, the deciding unit 1344 decides the contents of transition (actions) of the states until when the final image of the microstructure is obtained from the initial image 901 of the microstructure.

<Output Section 1350>

When the production process information is derived by the deciding unit 1344, the output section 1350 outputs the production process information. As a form of the output of the information, for example, it is possible to employ at least one of display with respect to a computer display, storage into an internal or external storage medium of the analysis apparatus 1300, and transmission with respect to an external device. The production process information output by the output section 1350 becomes information to be a guideline for producing the microstructure realizing the aimed S-S curve 201. Further, the output section 1350 may also control a production facility based on the production process information.

A developer and designer of the DP steel or the analysis apparatus 1300 can decide a production process regarding temperature control when producing the DP steel, based on the production process information output by the output section 1350. There is a case where it is not easy or it is impossible to realize the production process which is decided based on the production process information output by the output section 1350.

In such a case, at least either a change in the aimed S-S curve 201 which is input to the estimating section 1340 or a change in the predetermined range used in the aim determining unit 1343 is performed. For example, the value of the stress in the aimed S-S curve 201 which is input to the estimating section 1340 is reduced. In addition to or instead of this, the predetermined range used in the aim determining unit 1343 is increased. In a manner as described above, the production process information is derived again by the deciding unit 1344 in a state where at least one of the aimed S-S curve 201 and the predetermined range is changed. Such processing is repeated until when it becomes possible to realize the production process decided based on the production process information output by the output section 1350.

The DP steel is produced by performing the temperature control based on the production process information in the production facility. Consequently, the DP steel realizing the aimed S-S curve 201 is produced.

[Flow Chart]

Figure 14:
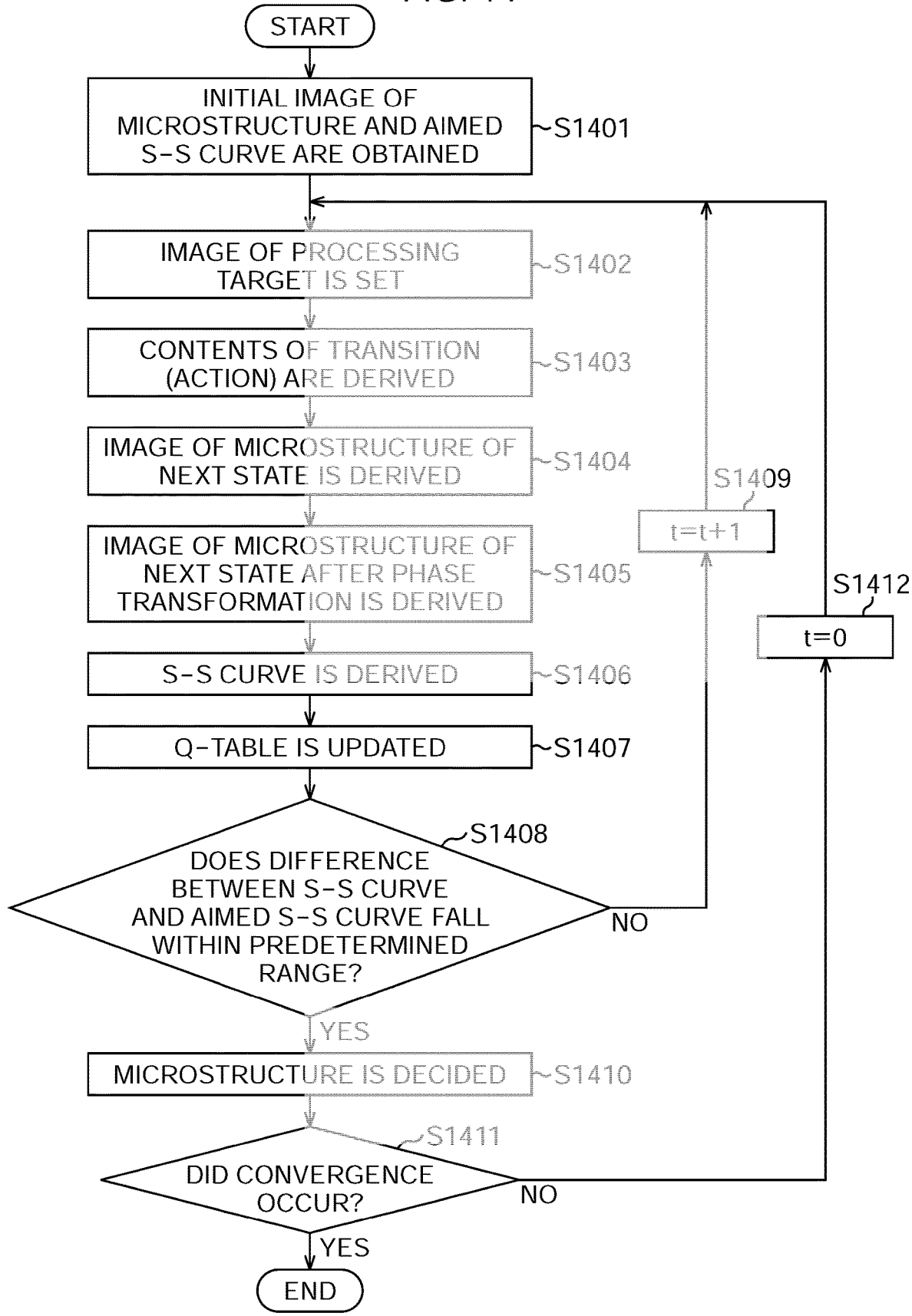
FIG. 14 is a flow chart illustrating the first embodiment and explaining one example of processing in the analysis apparatus when creating a leaning model.

Next, one example of the processing (analysis method) in the analysis apparatus 1300 when creating the learning model will be described while referring to a flow chart in FIG. 14.

First, in step S1401, the information obtaining section 1310 obtains the information regarding the initial image 901 of the microstructure and the aimed S-S curve 201.

Next, in step S1402, the state deriving unit 1321 sets the image of the microstructure being the processing target. In the first step S1402, the state deriving unit 1321 sets the initial image 901 of the microstructure as the image of the microstructure being the processing target.

Next, in step S1403, the state deriving unit 1321 refers to the Q-table in the middle of learning, to derive the contents of transition (action) of the state with respect to the image of the microstructure being the processing target. The Q-table is stored in the storage section 1330. The initial Q-table is previously set by uniform random numbers.

Next, in step S1404, the state deriving unit 1321 makes the state of the image of the microstructure being the processing target transit in accordance with the contents of transition (action) derived in step S1403. Consequently, the image of the microstructure after the transition (the microstructure of the next state) is derived.

Next, in step S1405, the state deriving unit 1321 derives the image of the microstructure after the phase transformation from the image of the microstructure generated in step S1404.

Next, in step S1406, the reward deriving unit 1322 derives the S-S curve from the image of the microstructure after the phase transformation derived in step S1405.

Next, in step S1407, the learning unit 1323 updates, based on the expression (12), the Q value of the element determined by the state corresponding to the image of the microstructure being the processing target (row) and the action corresponding to the contents of transition of the state derived in step S1403 (column), out of the elements in the Q-table.

Next, in step S1408, the aim determining unit 1324 determines whether or not the difference between the aimed S-S curve 201 and the S-S curve 202 derived in step S1406 falls within the predetermined range.

When, as a result of this determination, the difference between the aimed S-S curve 201 and the S-S curve 202 does not fall within the predetermined range, the processing proceeds to step S1409. When the processing proceeds to step S1409, the state deriving unit 1321 adds "1" to the number of times t of the transition of the image of the microstructure. Subsequently, the processing returns to step S1402. When the processing returns to step S1402 from step S1409, the state deriving unit 1321 re-sets, in step S1402, the image of the microstructure derived in the nearest step S1404 as the image of the microstructure being the processing target. The processing of steps S1403 to S1409 is repeatedly executed until when the difference between the aimed S-S curve 201 and the S-S curve 202 falls within the predetermined range.

When it is determined in step S1408 that the difference between the aimed S-S curve 201 and the S-S curve 202 falls within the predetermined range, the processing proceeds to step S1410. When the processing proceeds to step S1410, the deciding unit 1325 decides the state of the microstructure specified from the image of the microstructure being the processing target at a point of time where the difference between the aimed S-S curve 201 and the S-S curve 202 is determined to fall within the predetermined range in step S1408, as the state of the microstructure realizing the aimed S-S curve 201. The image of the microstructure is the final image of the microstructure. At a timing at which the processing in step S1410 is executed, the learning of one time of the Q-table is terminated.

Next, in step S1411, the convergence determining unit 1326 determines whether or not the predetermined convergence condition is satisfied. When, as a result of this determination, the predetermined convergence condition is not satisfied, the processing proceeds to step S1412. When the processing proceeds to step S1412, the number of times t of the transition of the image of the microstructure is initialized (t is set to 0). Subsequently, the processing returns to step S1402. The processing of steps S1402 to S1412 is repeatedly executed until when the predetermined convergence condition is satisfied.

When it is determined that the predetermined convergence condition is satisfied in step S1411, the learning of the Q-table is terminated.

Figure 15:
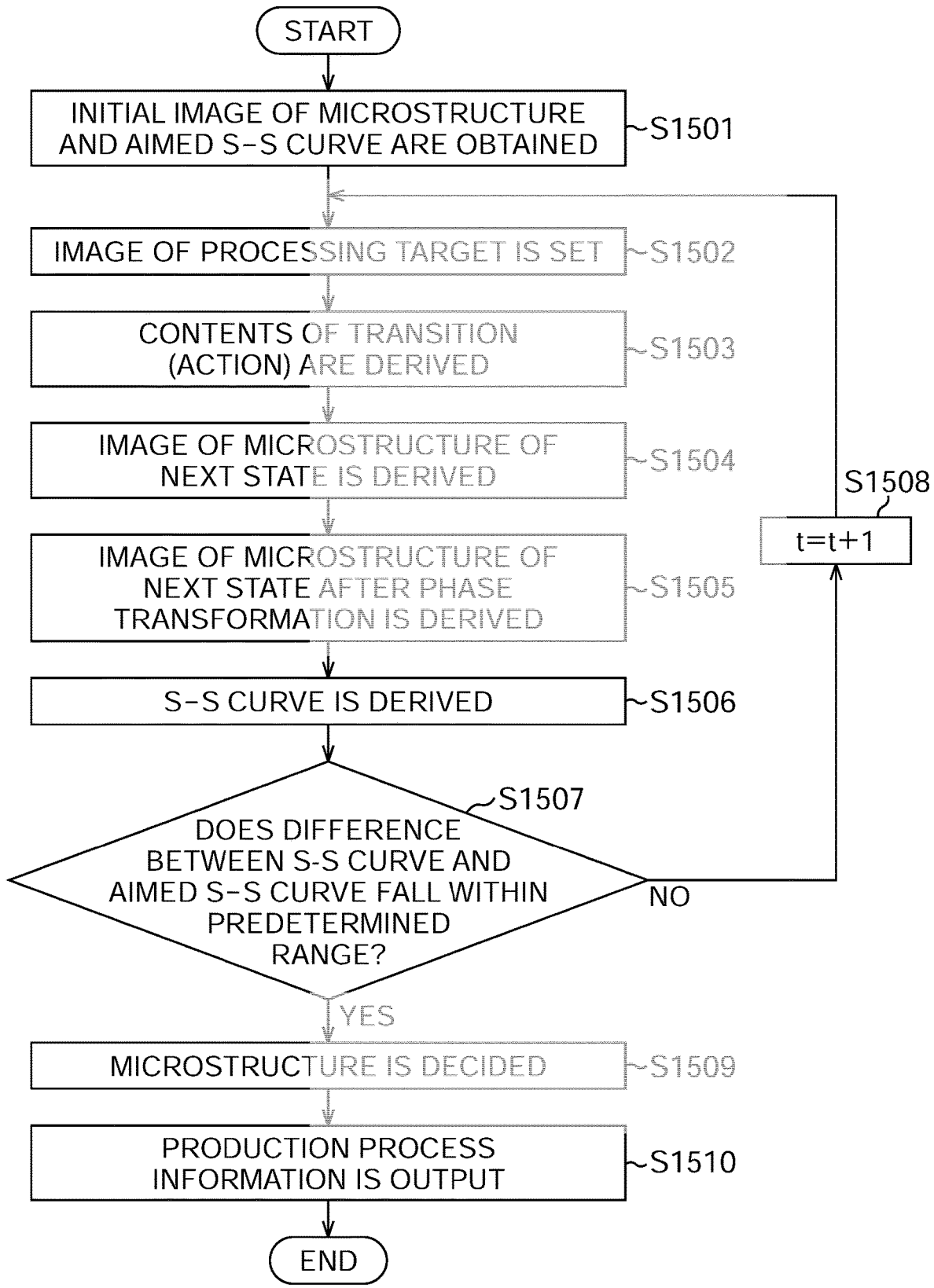
FIG. 15 is a flow chart illustrating the first embodiment and explaining one example of processing in the analysis apparatus when estimating contents of transition (actions) until when the final image of the microstructure is obtained from the initial image of the microstructure.

Next, one example of the processing (analysis method) in the analysis apparatus 1300 when estimating the contents of transition (actions) until when the final image of the microstructure is obtained from the initial image 901 of the microstructure will be described while referring to a flow chart in FIG. 15. The flow chart in FIG. 15 is executed after executing the flow chart in FIG. 14 (namely, after the performance of learning of the Q-table).

First, in step S1501, the information obtaining section 1310 obtains the information regarding the initial image 901 of the microstructure and the aimed S-S curve 201.

Next, in step S1502, the state deriving unit 1341 sets the image of the microstructure being the processing target. In the first step S1502, the state deriving unit 1341 sets the initial image 901 of the microstructure as the image of the microstructure being the processing target.

Next, in step S1503, the state deriving unit 1341 refers to the Q-table after the learning, to derive the contents of transition (action) of the state with respect to the image of the microstructure being the processing target. The Q-table is stored in the storage section 1330.

Next, in step S1504, the state deriving unit 1341 makes the state of the image of the microstructure being the processing target transit in accordance with the contents of transition (action) derived in step S1503. Consequently, the image of the microstructure after the transition (the microstructure of the next state) is derived.

Next, in step S1505, the state deriving unit 1341 derives the image of the microstructure after the phase transformation from the image of the microstructure generated in step S1504.

Next, in step S1506, the reward deriving unit 1342 derives the S-S curve from the image of the microstructure after the phase transformation derived in step S1505.

Next, in step S1507, the aim determining unit 1343 determines whether or not the difference between the aimed S-S curve 201 and the S-S curve 202 derived in step S1506 falls within the predetermined range.

When, as a result of this determination, the difference between the aimed S-S curve 201 and the S-S curve 202 does not fall within the predetermined range, the processing proceeds to step S1508. When the processing proceeds to step S1508, the state deriving unit 1341 adds "1" to the number of times t of the transition of the image of the microstructure. Subsequently, the processing returns to step S1502. When the processing returns to step S1502 from step S1508, the state deriving unit 1341 re-sets, in step S1502, the image of the microstructure derived in the nearest step S1504 as the image of the microstructure being the processing target. The processing of steps S1503 to S1508 is repeatedly executed until when the difference between the aimed S-S curve 201 and the S-S curve 202 falls within the predetermined range.

When it is determined in step S1507 that the difference between the aimed S-S curve 201 and the S-S curve 202 falls within the predetermined range, the processing proceeds to step S1509. When the processing proceeds to step S1509, the deciding unit 1344 decides the state of the microstructure specified from the image of the microstructure being the processing target at a point of time where the difference between the aimed S-S curve 201 and the S-S curve 202 is determined to fall within the predetermined range in step S1507, as the state of the microstructure realizing the aimed S-S curve 201. The image of the microstructure is the final image of the microstructure. Subsequently, the deciding unit 1344 derives the production process information realizing the aimed S-S curve 201.

Next, in step S1510, the output section 1350 outputs the production process information derived in step S1509. Further, the processing according to the flow chart in FIG. 15 is terminated.

[Configuration of Hardware]

Figure 16:
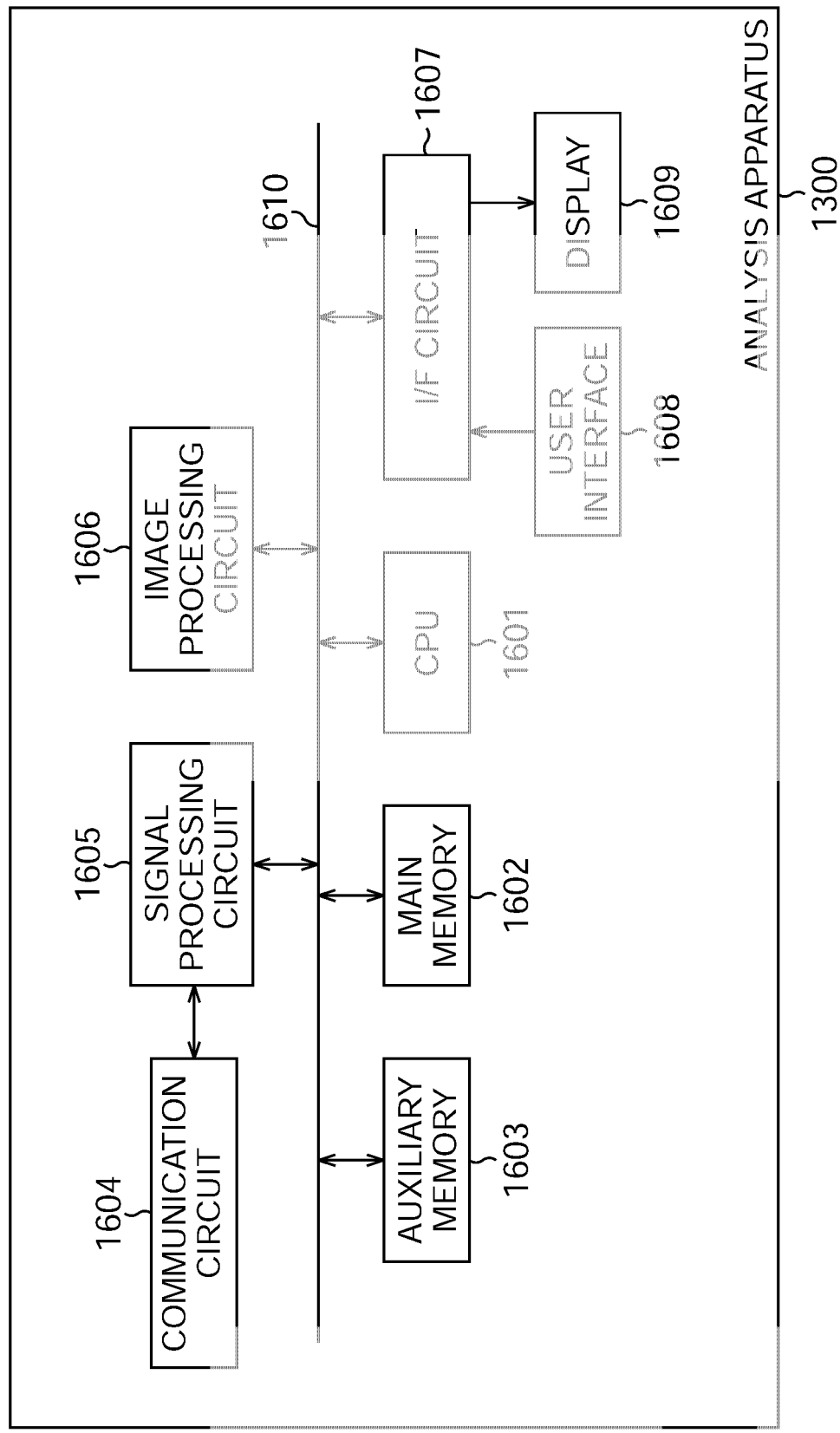
FIG. 16 is a view illustrating one example of a configuration of hardware of the analysis apparatus.

FIG. 16 is a view illustrating one example of a configuration of hardware of the analysis apparatus 1300.

In FIG. 16, the analysis apparatus 1300 has a CPU 1601, a main memory 1602, an auxiliary memory 1603, a communication circuit 1604, a signal processing circuit 1605, an image processing circuit 1606, an I/F circuit 1607, a user interface 1608, a display 1609, and a bus 1610.

The CPU 1601 is an arithmetic unit, and comprehensively controls the entire analysis apparatus 1300. The CPU 1601 uses the main memory 1602 as a work area to execute a program stored in the auxiliary memory 1603. The respective pieces of processing in the flow charts illustrated in FIG. 14 and FIG. 15 are executed when, for example, the CPU 1601 executes the programs stored in the auxiliary memory 1603. The main memory 1602 temporarily stores data. The auxiliary memory 1603 stores various kinds of data, in addition to the programs which are executed by the CPU 1601. The auxiliary memory 1603 stores information required for the pieces of processing in the flow charts illustrated in FIG. 14 and FIG. 15 described above.

The communication circuit 1604 is a circuit for performing communication with an outside of the analysis apparatus 1300.

The signal processing circuit 1605 performs various kinds of signal processing with respect to a signal received by the communication circuit 1604 and a signal which is input according to the control made by the CPU 1601. The creating section 1320 and the estimating section 1340 fulfill their functions by using, for example, the CPU 1601 and the signal processing circuit 1605.

The image processing circuit 1606 performs various kinds of image processing with respect to a signal which is input according to the control made by the CPU 1601. The signal after being subjected to the image processing is output to the display 1609.

The user interface 1608 is a part with which an operator issues instructions to the analysis apparatus 1300. The user interface 1608 has, for example, a button, a switch, a dial, or the like. Further, the user interface 1608 may also have a graphical user interface using the display 1609. The information obtaining section 1310 fulfills its function by using, for example, one of a set of the CPU 1601, the signal processing circuit 1605, and the user interface 1608, and a set of the CPU 1601, the communication circuit 1604, and the signal processing circuit 1605.

The display 1609 displays an image based on the signal output from the image processing circuit 1606. The I/F circuit 1607 performs data exchanges with a device that is connected to the I/F circuit 1607. In FIG. 16, the user interface 1608 and the display 1609 are indicated as devices connected to the I/F circuit 1607. However, the device connected to the I/F circuit 1607 is not limited to these. For example, a portable storage medium may also be connected to the I/F circuit 1607. Further, at least a part of the user interface 1608 and the display 1609 may also be provided on the outside of the analysis apparatus 1300.

The output section 1350 fulfills its function by using, for example, at least any one of a set of the communication circuit 1604 and the signal processing circuit 1605, and a set of the image processing circuit 1606, the I/F circuit 1607, and the display 1609.

Note that the CPU 1601, the main memory 1602, the auxiliary memory 1603, the signal processing circuit 1605, the image processing circuit 1606, and the I/F circuit 1607 are connected to the bus 1610. The communication among these components is performed via the bus 1610. Further, the hardware of the analysis apparatus 1300 is not limited to one illustrated in FIG. 16 as long it can realize the function of the analysis apparatus 1300 described above.

[Summary]

As described above, in the present embodiment, the analysis apparatus 1300 derives the contents of transition (action) of the state of the image of the microstructure. The analysis apparatus 1300 derives, according to the contents of transition, the image of the microstructure after the transition. The analysis apparatus 1300 derives the S-S curve by using the image of the microstructure after the transition. When the difference between the S-S curve and the aimed S-S curve does not fall within the predetermined range, the analysis apparatus 1300 derives again the contents of transition (action) of the state of the image of the microstructure. The analysis apparatus 1300 repeats the above-described processing until when the difference between the S-S curve and the aimed S-S curve falls within the predetermined range. The analysis apparatus 1300 decides the state specified from the image of the microstructure after the transition at a point of time where the difference between the S-S curve and the aimed S-S curve falls within the predetermined range, as the state of the microstructure realizing the aimed S-S curve.

Therefore, it is possible to connect the physical phenomenon between the spatial hierarchies. Accordingly, it becomes possible to derive the factor of the micro system (the state of the microstructure) from the factor of the macro system (the S-S curve) according to the physical phenomenon that occurs inside the DP steel based on a small number of data. Consequently, when the cause and the result connected by the physical phenomenon belong to the different spatial hierarchies, it is possible to accurately estimate the cause from the result.

Further, in the present embodiment, the analysis apparatus 1300 performs the reinforcement learning by using the processing including the processing of repeatedly deciding the state of the microstructure realizing the aimed S-S curve. Therefore, it is possible to realize not only the function corresponding to the interpolation but also the function corresponding to the extrapolation in the case of using the transition function derived by the reinforcement learning.

Further, in the present embodiment, the analysis apparatus 1300 decides the contents of transition (actions) of the states until when the final image of the microstructure is obtained from the initial image of the microstructure of the DP steel being one example of the structural material. Accordingly, it is possible to obtain an index regarding in what way the microstructure is transited to enable the production of the structural material realizing the aimed S-S curve. Therefore, it is possible to derive the production process for producing the structural material realizing the aimed S-S curve. It is possible to produce the structural material realizing the aimed S-S curve without producing the structural material again and again. This makes it possible to reduce a development cost and a production cost for the structural material.

In the present embodiment, the analysis apparatus 1300 derives the image of the microstructure after the phase transformation corresponding to the image of the microstructure formed only of the soft phase. Therefore, it is possible to easily derive the image of the microstructure after the phase transformation. Further, by previously preparing the image of the microstructure, it is possible to easily change the proportion of the hard phase and derive the image of the microstructure after the phase transformation.

MODIFIED EXAMPLES

First Modified Example

In the present embodiment, the explanation has been made by citing the case, as an example, where the S-S curve is employed as the factor (physical quantity) regarding the mechanical property of the DP steel. However, the factor regarding the mechanical property is not limited to the S-S curve. For example, when the analysis target is the structural material, it is possible to set at least one of the tensile strength and the uniform elongation as the factor regarding the mechanical property. The tensile strength is the maximum stress in the S-S curve. The uniform elongation is a strain corresponding to the maximum stress in the S-S curve. Further, it is also possible to use 0.2% proof stress or total elongation as the factor regarding the mechanical property.

Second Modified Example

In the present embodiment, the explanation has been made by citing the case, as an example, where the image of the microstructure includes the information regarding the grain boundary and the orientation of the crystal grain and the information regarding the distribution of the element concentration in the microstructure. However, it is not always required to design as above. For example, it is also possible that the information regarding the distribution of the element concentration in the microstructure is managed separately from the image of the microstructure.

Third Modified Example

In the present embodiment, the explanation has been made by citing the case, as an example, where the analysis target is the DP steel. However, the analysis target is not limited to the DP steel. For example, the analysis target may also be a material having a microstructure, other than the DP steel. It is possible to set a steel material other than the DP steel and other metal materials as the analysis target. Further, the analysis target may also be a material other than the metal material (a semiconductor, for example). Further, the analysis target may also be one other than the material.

Fourth Modified Example

It is preferable that, as in the present embodiment, the image of the microstructure formed only of the soft phase is derived, and the image of the microstructure after the phase transformation corresponding to the image of the microstructure formed only of the soft phase is derived. However, it is not always required to design as above. For example, the image of the microstructure after the phase transformation may also be previously prepared. In this case, the analysis apparatus 1300 searches for the transition of the images of the microstructures after the phase transformation (not the images 0a to 62a of the microstructures but the images 0b to 62b of the microstructures).

Fifth Modified Example

It is preferable that the learning model is created as in the present embodiment. However, it is also possible to design such that the processing by the state deriving unit 1341, the reward deriving unit 1342, the aim determining unit 1343, and the deciding unit 1344 is performed without using the learning model. In this case, the state deriving unit 1341 does not refer to the Q-table. Instead of this, the state deriving unit 1341 randomly selects to derive one of the contents of transition (actions) of the states of the microstructures of the DP steel, for example.

Sixth Modified Example

In the present embodiment, the explanation has been made by citing, as an example, the analysis system in which the creating section 1320 and the estimating section 1340 are included in the same analysis apparatus 1300. However, it is not always required to design as above. The creating section 1320 and the estimating section 1340 may also be disposed in separate pieces of analysis apparatus. In this case, the pieces of analysis apparatus are included in the analysis system. Further, the storage section 1330 may also be provided on the outside of the analysis apparatus 1300.

Second Embodiment

Next, a second embodiment will be described. In the first embodiment, the explanation has been made by citing the case, as an example, where the agent is the analysis apparatus 1300 (the state deriving units 1321, 1341). On the contrary, in the present embodiment, explanation will be made by citing a case, as an example, where the agent is a human being (a material designer). The present embodiment and the first embodiment are mainly different in the configuration and the processing due to the different agents. Therefore, in the explanation of the present embodiment, detailed explanation regarding a part same as that of the first embodiment will be omitted.

[Analysis Apparatus 1700]

One example of an analysis apparatus 1700 of the present embodiment will be described. Also in the present embodiment, the analysis target is assumed to be the DP steel, similarly to the first embodiment. Further, also in the present embodiment, explanation will be made by assuming that a microstructure of the DP steel includes no region (air gap and the like) except for a hard phase (a martensite phase) and a soft phase (a ferrite phase), similarly to the first embodiment.

Figure 17:
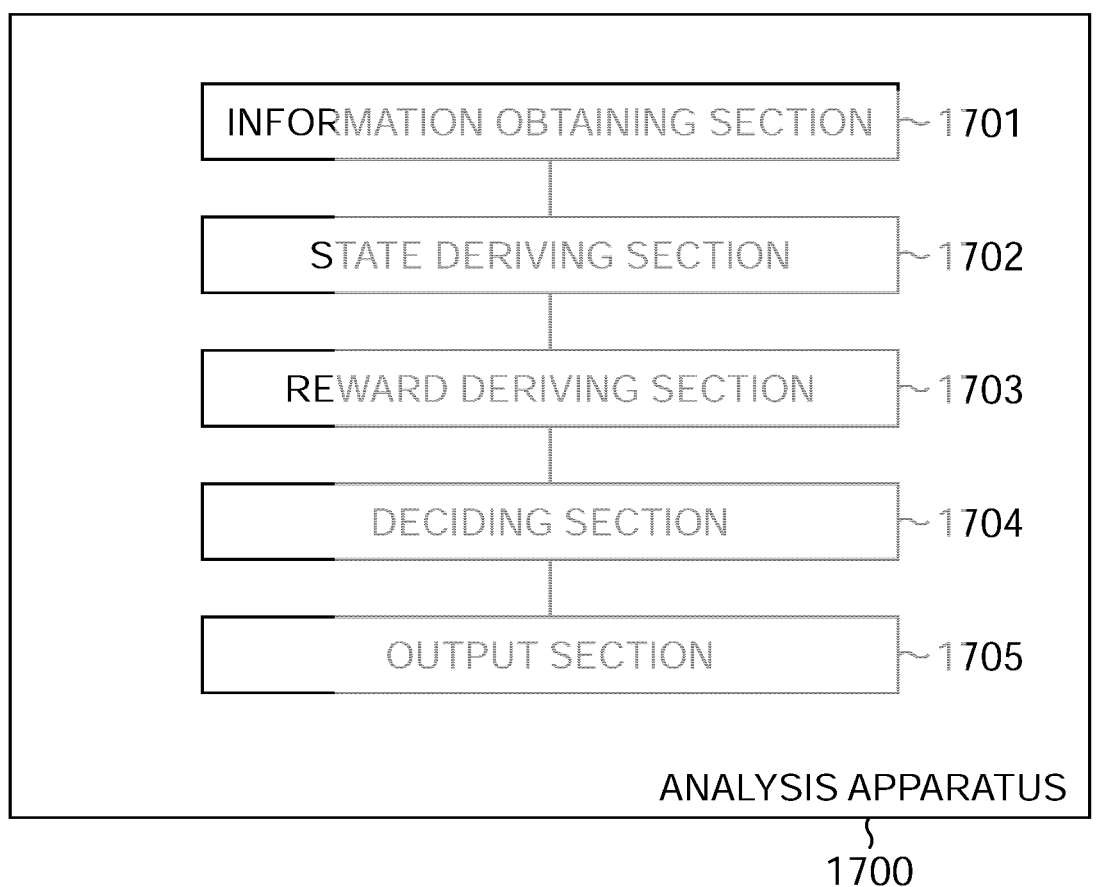
FIG. 17 is a view illustrating a second embodiment and illustrating one example of a functional configuration of an analysis apparatus.
Figure 18:
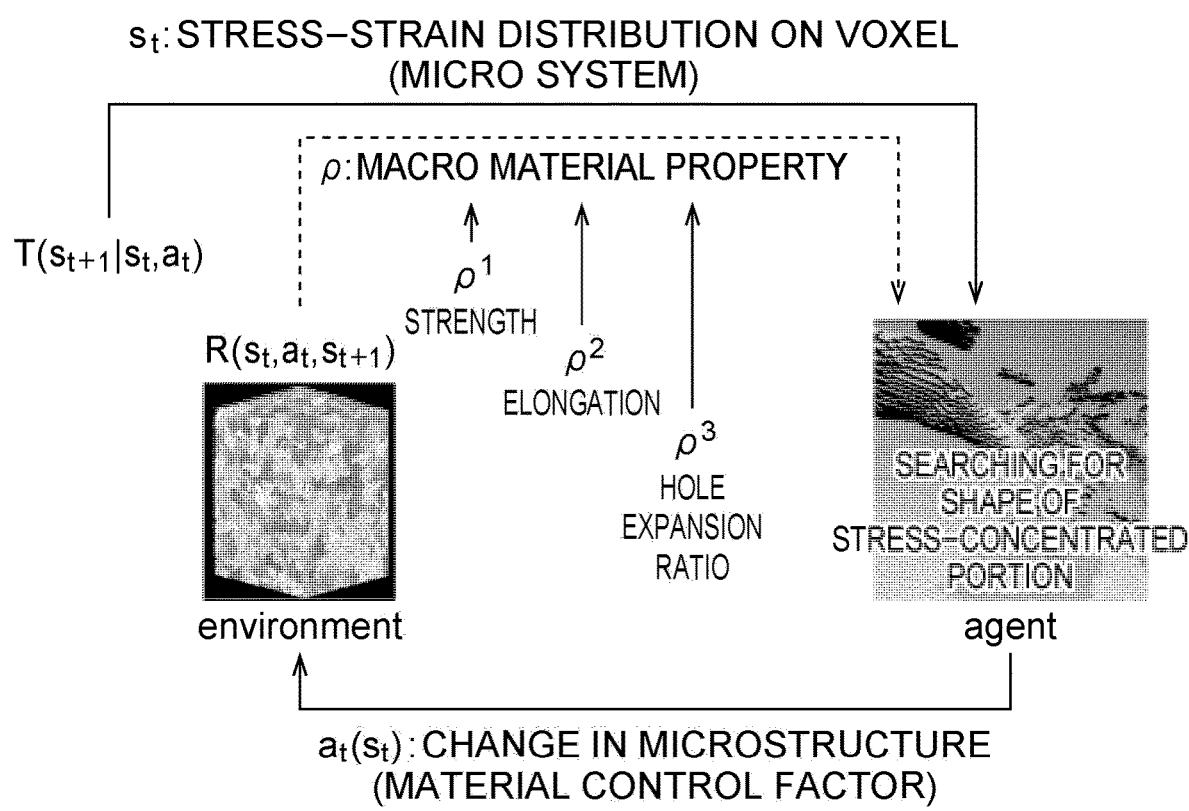
FIG. 18 is a view illustrating the second embodiment and illustrating, in a conceptual manner, one example of processing in the analysis apparatus.

FIG. 17 is a view illustrating one example of a functional configuration of the analysis apparatus 1700. FIG. 18 is a view explaining, in a conceptual manner, one example of processing in the analysis apparatus 1700. The hardware of the analysis apparatus 1700 can be realized by one illustrated in FIG. 16, for example.

<Information Obtaining Section 1701>

An information obtaining section 1701 obtains a three-dimensional image of a microstructure of the DP steel being the analysis target. In the explanation hereinbelow, the three-dimensional image of the microstructure of the DP steel is referred to as a microstructure 3D image according to need. The microstructure 3D image can be obtained by using a well-known technique such as, for example, EBSD (Electron Backscattering Diffraction) and TEM (Transmission Electron Microscope). Therefore, detailed explanation thereof will be omitted here. Note that to each voxel of the microstructure 3D image, a binarized label indicating whether the voxel is either the soft phase or the hard phase, is given.

<State Deriving Section 1702>

The state deriving section 1702 is a first deriving section. The state deriving section 1702 changes, based on an instruction issued from the outside, the value of the binarized label in each voxel of the microstructure 3D image.

The instruction from the outside is issued as follows, for example. Namely, the agent (material designer) performs an operation of changing, with the use of a VR (Virtual Reality) apparatus, a microstructure distribution (regions of the soft phase and the hard phase) in a VR space. The VR apparatus includes, for example, a VR head mounted display and a gesture input device. The state deriving section 1702 changes the value of the binarized label in each voxel of the microstructure 3D image so as to comply with the contents of the operation. The agent (material designer) can change a value of the binarized label in a voxel corresponding to a stress-concentrated portion in the DP steel, for example.

In the present embodiment, the microstructure 3D image corresponds to the environment, as illustrated in FIG. 18. The changing of the value of the binarized label in each voxel of the microstructure 3D image, corresponds to the action $a_t$ in the Markov decision processes. Further, the value of the binarized label in each voxel of the microstructure 3D image corresponds to the cause in the inverse problem. Further, when the value of the binarized label in each voxel of the microstructure 3D image is changed, the state $S_t$ transits. The state includes a stress and a strain in each voxel, as will be described later. Further, in the present embodiment, the number of times t of changing the microstructure is used as one corresponding to the time t in the Markov decision processes. Here, explanation will be continued by assuming that the value of the binarized label in each voxel of the microstructure 3D image at the time t+1 is obtained by changing the value of the binarized label in each voxel of the microstructure 3D image.

N in the finite set S of the states of the microstructures=$\{s^1, s^2, \ldots, s^N\}$ is the total number of combinations of the values of the binarized label in the voxel of the microstructure 3D image. In the present embodiment, it is assumed that each state $s^n$ of the finite set S of the states of the microstructures includes, as its elements, the value of the binarized label, the stress, and the strain in each voxel. Note that it is also possible that the state is defined separately for each of the value of the binarized label, the stress, and the strain.

Further, K in the finite set A of the actions of the microstructures=$\{a^1, a^2, \ldots, a^K\}$ is the total number of combinations of the values regarding the change in the value of the binarized label in the voxel of the microstructure 3D image. In the present embodiment, each action $a^k$ of the finite set A of the actions of the microstructures is assumed to include, as its element, a value regarding the change in the value of the binarized label in each voxel. The value regarding the change is a value indicating whether or not the value of the binarized label is maintained as it is.

After changing the value of the binarized label in each voxel of the microstructure 3D image, the state deriving section 1702 sets an external strain (external force to be a tensile load) to be applied to the DP steel. The state deriving section 1702 derives, through elastoplasticity analysis, a stress $\sigma(x)$ and a strain $\varepsilon(x)$ at each position x of the microstructure 3D image when the set external strain is applied to the DP steel. Here, explanation will be made by citing a case, as an example, where each position x of the microstructure 3D image is set to (a position of) each voxel x of the microstructure 3D image, in order to simplify the explanation.

As described above, in the present embodiment, explanation will be made by citing a case, as an example, where the DP steel is divided in a unit of voxel (namely, one divided region is set to one voxel), and the stress $\sigma(x)$ and the strain $\varepsilon(x)$ in the divided plural voxels are derived. However, the divided region is not limited to such a region. For example, a mesh region used in numerical analysis may also be set to the divided region. Note that the divided region indicates an individual region when dividing the DP steel being the analysis target into a plurality of regions. Further, in the present embodiment, the state of each of the microstructures is determined based on the value of the binarized label in each voxel of the microstructure 3D image. In the present embodiment, the value of the binarized label in each voxel of the microstructure 3D image is the first factor (the factor regarding the microstructure in each of the plurality of divided regions of the metal material).

In the present embodiment, the state deriving section 1702 uses the homogenization method to derive a strain $\varepsilon_{t+1}(u_{t+1})(x)$ and a stress $\sigma_{t+1}(\varepsilon_{t+1}(u_{t+1}))(x)$. Also in the present embodiment, the homogenization method plays a role of methodology which consistently and logically explains the physical phenomenon between the spatial hierarchies described above. The homogenization method is one explained in the first embodiment.

The state deriving section 1702 performs derivation of a pair of the strain $\varepsilon_{t+1}(u_{t+1})(x)$ and the stress $\sigma_{t+1}(\varepsilon_{t+1}(u_{t+1}))(x)$, with respect to each of the voxels at all positions x.

In the present embodiment, the state deriving section 1702 sets predetermined plural external strains as external strains to be applied to the DP steel. The state deriving section 1702 derives the pair of the strain $\varepsilon_{t+1}(u_{t+1})(x)$ and the stress $\sigma_{t+1}(\varepsilon_{t+1}(u_{t+1}))(x)$, with respect to each of the voxels at all positions x in a manner as above, in each of the cases where each of the external strains is applied to the DP steel. As above, in the present embodiment, explanation will be made by citing a case, as an example, where the setting of the external strain to be applied to the DP steel is changed to perform mutually different actions on the DP steel. Here, any action may be performed on the analysis target as long as the state of the analysis target is designed to be changed. Specifically, the action indicates an operation for changing the state of the analysis target.

The state deriving section 1702 changes the value of the binarized label of the microstructure 3D image in a manner as described above, to thereby make the state (the strain $\varepsilon_{t+1}(u_{t+1})(x)$ and the stress $\sigma_{t+1}(\varepsilon_{t+1}(u_{t+1}))(x)$ in each voxel x) of the microstructure of the DP steel transit. In the present embodiment, as illustrated in FIG. 17, the state (the strain $\varepsilon_{t+1}(u_{t+1})(x)$ and the stress $\sigma_{t+1}(\varepsilon_{t+1}(u_{t+1}))(x)$ in each voxel x) of the microstructure of the DP steel corresponds to the state in the Markov decision processes and the result in the inverse problem. Further, since the state of the microstructure of the DP steel is made to transit in a manner as described above, when the action $a_t$ is taken in the state $s_t$ at the time t, the state $s_t$ transits to the state $s_{t+1}$ at the next time t+1, and this state $s_{t+1}$ is uniquely determined. In the explanation hereinbelow, this uniquely-determined state $s_{t+1}$ is set to be represented as $a_t(s_t)$. In that case, the transition function $f(s_{t+1}|s_t, a_t)$ becomes a function that takes 1 when $s_{t+1}$ is $a_t(s_t)$, and that takes 0 in a case other than the above.

The state deriving section 1702 derives a pair of a strain $\varepsilon_t(u_t)(x)$ and a stress $\sigma_t(\varepsilon_t(u_t))(x)$, in each of voxels at all positions x in a manner as above when the external strain is applied to the DP steel, every time it changes the value of the binarized label in each voxel of the microstructure 3D image and updates the number of times t of changing the microstructure. The state deriving section 1702 performs derivation of the pair of the strain $\varepsilon_t(u_t)(x)$ and the stress $\sigma_t(\varepsilon_t(u_t))(x)$ in each of the voxels at all positions x, in each of the cases where the predetermined plural external strains are applied to the DP steel. In the present embodiment, the pair of the strain $\varepsilon_{t+1}(u_{t+1})(x)$ and the stress $\sigma_{t+1}(\varepsilon_{t+1}(u_{t+1}))(x)$ at each position x (voxel) is the second factor (the factor indicating the mechanical property in each of the plurality of divided regions of the metal material). The pair is individually determined with respect to each of the microstructures.

<Reward Deriving Section 1703>

The reward deriving section 1703 is a second deriving section. The reward deriving section 1703 is activated when the pair of the strain $\varepsilon_t(u_t)(x)$ and the stress $\sigma_t(\varepsilon_t(u_t))(x)$ in each of the voxels at all positions x is derived when a certain external strain is applied to the DP steel by the state deriving section 1702. The reward deriving section 1703 derives central values of the strains $\varepsilon_t(u_t)(x)$ and the stresses $\sigma_t(\varepsilon_t(u_t))(x)$ in the voxels at all positions x. As the central value, an average value is used, for example. Consequently, one pair of the strain and the stress of the DP steel when applying the certain external strain to the DP steel is obtained.

The reward deriving section 1703 executes the derivation of the central values of the strain and the stress of the DP steel in a manner as described above, in each of the cases where the predetermined plural external strains are applied to the DP steel. Consequently, a plurality of pairs each composed of the stress and the strain of the DP steel are obtained. Subsequently, the reward deriving section 1703 derives the S-S curved from those pairs.

The reward deriving section 1703 derives the maximum stress in the S-S curve as the tensile strength of the DP steel. The reward deriving section 1703 uses a strain corresponding to the stress, to thereby derive the uniform elongation of the DP steel.

Consequently, the tensile strength and the uniform elongation of the DP steel in the state (the strain $\varepsilon_t(u_t)(x)$ and the stress $\sigma_t(\varepsilon_t(u_t))(x)$ in the voxel at each position x) of the microstructure of the DP steel are derived.

Besides, the reward deriving section 1703 derives a hole expansion ratio of the DP steel based on the tensile strength and the uniform elongation of the DP steel. The hole expansion ratio of the DP steel can be obtained by, for example, previously performing an experiment, to thereby determine a function indicating a relationship between the tensile strength and the uniform elongation of the DP steel, and the hole expansion ratio of the DP steel. Further, the hole expansion ratio of the DP steel can also be obtained by creating, with the use of a neural network, a model of predicting the hole expansion ratio of the DP steel based on the tensile strength and the uniform elongation of the DP steel.

In a manner as described above, the reward deriving section 1703 derives, as the values of the tensile strength, the uniform elongation, and the hole expansion ratio of the DP steel, the values when the value of the binarized label in each voxel of the microstructure 3D image is changed to make the state of the microstructure of the DP steel transit. In the present embodiment, the processing procedure for deriving the tensile strength, the uniform elongation, and the hole expansion ratio of the DP steel in a manner as described above, corresponds to reward functions $r^1(s_t, a_t, s_{t+1})$, $r^2(s_t, a_t, s_{t+1})$, $r^3(s_t, a_t, s_{t+1})$.

Specifically, the reward function $r^1(s_t, a_t, s_{t+1})$ is defined as one which derives an amount of change (increment or decrement) of the tensile strength of the DP steel when a state where the immediate reward is $r^1_{t+1}$ transits from $s_t$ to $s_{t+1}$. The reward function $r^2(s_t, a_t, s_{t+1})$ is defined as one which derives an amount of change (increment or decrement) of the uniform elongation of the DP steel when a state where the immediate reward is $r^2_{t+1}$ transits from $s_t$ to $s_{t+1}$. The reward function $r^3(s_t, a_t, s_{t+1})$ is defined as one which derives an amount of change (increment or decrement) of the hole expansion ratio of the DP steel when a state where the immediate reward is $r^3_{t+1}$ transits from $s_t$ to $s_{t+1}$.

The reward deriving section 1703 derives the tensile strength, the uniform elongation, and the hole expansion ratio of the DP steel in a manner as above every time the value of the binarized label in each voxel of the microstructure 3D image is changed and the number of times t of changing the microstructure is updated. The tensile strength, the uniform elongation, and the hole expansion ratio of the DP steel are factors regarding the mechanical property in the entire DP steel. As described above, in the present embodiment, the tensile strength, the uniform elongation, and the hole expansion ratio of the DP steel are the third factors (the factors regarding the mechanical property in the entire metal material). The tensile strength, the uniform elongation, and the hole expansion ratio of the DP steel are factors determined with respect to a set of the microstructures of the DP steel. The tensile strength, the uniform elongation, and the hole expansion ratio of the DP steel are determined with respect to only the entire DP steel, and are not factors which are individually determined with respect to each of the microstructures of the DP steel. Note that it is also possible to prepare the S-S curve as a table. In this case, from an interpolation formula for values in the table, the maximum stress in the S-S curve can be derived. The interpolation formula is one example of a mathematical expression representing a physical phenomenon with which the analysis target is to comply. A function representing a relationship between the tensile strength and the uniform elongation of the DP steel, and the hole expansion ratio of the DP steel, is one example of a mathematical expression representing the physical phenomenon with which the analysis target is to comply. The hole expansion ratio of the DP steel may also be derived by using a model other than the mathematical expression.

<Deciding Section 1704>

If the reward (the tensile strength and the uniform elongation, for example) falls within an aimed range when the number of times t of changing the microstructure is M (t=M), by using the expression (1), cumulative rewards $\rho^1$, $\rho^2$, $\rho^3$ regarding the respective reward functions $r^1$, $r^2$, $r^3$ are represented as in the following expression (14), expression (15), and expression (16), respectively.

[Mathematical expression 12]

$$\rho^1 = \sum_{t=0}^{M-1} \gamma_1^t r_{t+1}^1 \qquad (14)$$

$$\rho^2 = \sum_{t=0}^{M-1} \gamma_2^t r_{t+1}^2 \qquad (15)$$

$$\rho^3 = \sum_{t=0}^{M-1} \gamma_3^t r_{t+1}^3 \qquad (16)$$

Here, discount factors $\gamma_1$, $\gamma_2$, $\gamma_3$ are experientially determined for each of the reward functions $r^1$, $r^2$, $r^3$, based on past performance and the like, for example. Note that if all of $\gamma_1$, $\gamma_2$, $\gamma_3$ are set to "0", only immediate rewards $r^1_t$, $r^2_t$, $r^3_t$ when the number of times t of changing the microstructure is 1 are employed (the cumulation of rewards is not performed).

An expected value $E[\rho|\pi]$ of cumulative rewards obtained when the action according to the policy $\pi$ (changing of the value of the binarized label in each voxel) is performed with respect to the state $s_0$ of the initial microstructure to change the state, which is performed M times, is represented as in the following expression (17). Further, based on the expression (2), the optimum policy $\pi^*$ (the optimum value of the value of the binarized label in each voxel) is derived.

[Mathematical expression 13]

$$E[\rho|\pi] = \sum_{t=0}^{M-1} \gamma^t E[r_{t+1}|\pi] = \qquad (17)$$

$$\sum_{t=0}^{M-1} \gamma^t \sum_{\substack{a_0 \in A_{s_0}, \ldots, a_t \in A_{s_t} \\ s_1 = a_0(s_0), \ldots, s_{t+1} = a_t(s_t)}} \left\{ \prod_{\tau=0}^{t} \pi(s_\tau)(a_\tau) \right\} r(s_t, a_t, s_{t+1})$$

When the tensile strength, the uniform elongation, and the hole expansion ratio of the DP steel are derived by the reward deriving section 1703, the deciding section 1704 derives cumulative rewards $\rho^1$, $\rho^2$, $\rho^3$ of the tensile strength, the uniform elongation, and the hole expansion ratio, respectively. The deciding section 1704 derives a single cumulative reward $\rho$ based on the cumulative rewards $\rho^1$, $\rho^2$, $\rho^3$. Normally, it is difficult to maximize all of the rewards of the tensile strength, the uniform elongation, and the hole expansion ratio. Accordingly, as the cumulative reward $\rho$, for example, it is possible to use a solution of a non-cooperative game (equilibrium solution) in a game theory called Nash equilibrium. Note that the cumulative reward $\rho$ is not limited to one as described above. The deciding section 1704 may also derive, for example, an accumulated value of the cumulative rewards $\rho^1$, $\rho^2$, $\rho^3$ as the cumulative reward $\rho$.

The analysis apparatus 1700 repeatedly performs the changing of the value of the binarized label in each voxel of the microstructure 3D image and repeatedly executes the above-described processing with the use of the state deriving section 1702, the reward deriving section 1703, and the deciding section 1704, until when the deciding section 1704 derives the optimum policy $\pi^*$ (the optimum value of the value of the binarized label in each of all voxels) based on the expression (2) in a manner as described above. This repetition processing can be performed until when a difference between a previous value and a current value of the cumulative reward ρ (value function) falls within a predetermined range by employing the aforementioned dynamic programming, for example. In the present embodiment, the cumulative reward ρ (value function) becomes an evaluation value with respect to the above-described third factors. The above-described predetermined condition is that the difference between the previous value and the current value of the cumulative reward ρ (value function) falls within the predetermined range.

<Output Section 1705>

The output section 1705 outputs, when the optimum value of the value of the binarized label in each of all voxels is derived by the deciding section 1704, information indicating that. As a form of the output of the information, for example, it is possible to employ at least one of display with respect to a computer display, storage into an internal or external storage medium of the analysis apparatus 1700, and transmission with respect to an external device.

[Flow Chart]

Next, one example of the processing (analysis method) in the analysis apparatus 1700 will be described while referring to a flow chart in FIG. 19.

First, in step S1901, the information obtaining section 1701 obtains the microstructure 3D image.

Next, in step S1902, the state deriving section 1702 changes, based on an instruction issued from the outside, the value of the binarized label in each voxel of the microstructure 3D image.

Next, in step S1903, the state deriving section 1702 adds "1" to the number of times t of changing the microstructure. The initial value of the number of times t of changing the microstructure is "0".

Next, in step S1904, the state deriving section 1702 sets the external strain.

Next, in step S1905, the state deriving section 1702 uses the homogenization method to derive the pair of the strain $\varepsilon_t(u_t)(x)$ and the stress $\sigma_t(\varepsilon_t(u_t))(x)$ in the voxel at each position x when the external strain set in step S1904 is applied to the DP steel.

Next, in step S1906, the state deriving section 1702 determines whether or not all of the predetermined plural external strains are set as the external strains to be applied to the DP steel. When, as a result of this determination, all of the external strains are not set, the processing returns to step S1904. Subsequently, in step S1904, the state deriving section 1702 sets a new external strain. In step S1905, the state deriving section 1702 uses the homogenization method to derive the pair of the strain $\varepsilon_t(u_t)(x)$ and the stress $\sigma_t(\varepsilon_t(u_t))(x)$ in the voxel at each position x when the new external strain is applied to the DP steel. Further, the processing of steps S1904 to S1906 is repeatedly executed until when all of the external strains are set.

When the pairs each composed of the strain $\varepsilon_t(u_t)(x)$ and the stress $\sigma_t(\varepsilon_t(u_t))(x)$ in the voxels at the respective positions x when the predetermined plural external strains are applied to the DP steel as the external strains to be applied to the DP steel are derived in a manner as described above, the processing proceeds to step S1907.

In step S1907, the reward deriving section 1703 derives the central values of the strains $\varepsilon_t(u_t)(x)$ and the stresses $\sigma_t(\varepsilon_t(u_t))(x)$ in the voxels at all positions x when the external strain set in step S1904 is applied to the DP steel, with respect to each of the external strains set in step S1904, and based on a result thereof, the reward deriving section 1703 creates the S-S curve.

Next, in step S1908, the reward deriving section 1703 derives the maximum stress in the S-S curve as the tensile strength of the DP steel. The reward deriving section 1703 uses the strain corresponding to the maximum stress in the S-S curve, to thereby derive the uniform elongation of the DP steel.

Next, in step S1909, the reward deriving section 1703 derives the hole expansion ratio of the DP steel based on the tensile strength and the uniform elongation of the DP steel derived in step S1908.

Next, in step S1910, the deciding section 1704 derives, based on the tensile strength, the uniform elongation, and the hole expansion ratio of the DP steel derived in steps S1908 to S1910 during a period of time in which the number of times t of changing the microstructure becomes the current value from "1", the cumulative rewards $\rho^1$, $\rho^2$, $\rho^3$ of the tensile strength, the uniform elongation, and the hole expansion ratio, respectively, and derives the cumulative reward ρ based on the cumulative rewards $\rho^1$, $\rho^2$, $\rho^3$.

Next, in step S1911, the deciding section 1704 determines whether or not the cumulative reward ρ derived in step S1910 satisfies the predetermined convergence condition. When, as a result of this determination, the cumulative reward ρ does not satisfy the predetermined condition, the processing returns to step S1902. Subsequently, in step S1902, the state deriving section 1702 changes the value of the binarized label in each voxel of the microstructure 3D image. After that, the processing of steps S1902 to S1911 is repeatedly executed until when the cumulative reward ρ satisfies the predetermined convergence condition by the processing of steps S1903 to S1910.

When the cumulative reward ρ satisfies the predetermined convergence condition in a manner as described above, the processing proceeds to step S1912. When the processing proceeds to step S1912, the deciding section 1704 decides the value of the binarized label of the microstructure changed in step S1902 when the predetermined convergence condition is satisfied (the latest value), as the optimum value of the value of the binarized label in each voxel.

Next, in step S1913, the output section 1705 outputs the information indicating the optimum value of the value of the binarized label in each voxel.

Figure 19:
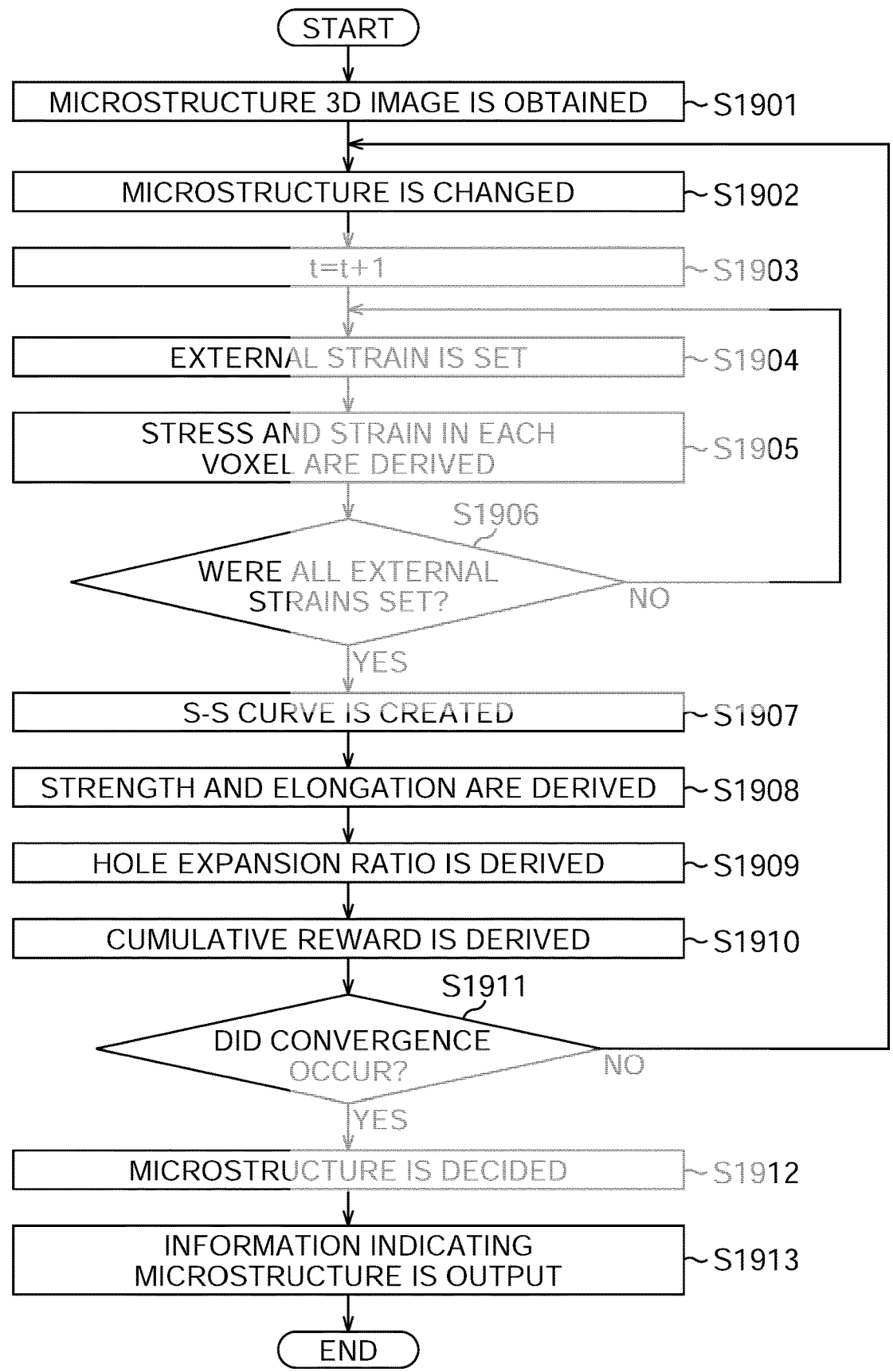
FIG. 19 is a flow chart illustrating the second embodiment and explaining one example of processing in the analysis apparatus.

Further, the processing according to the flow chart in FIG. 19 is terminated.

[Summary]

As described above, in the present embodiment, when the value of the binarized label (the value indicating the hard phase or the soft phase) of each voxel x of the microstructure 3D image is changed, the analysis apparatus 1700 uses the homogenization method to derive the stresses and the strains in the respective voxels when the external strain is applied to the DP steel, and derives the central values of the stresses and the strains. The analysis apparatus 1700 executes the derivation of the central values of the stresses and the strains of the respective voxels, in each of the cases where the previously set external strains are applied to the DP steel. The analysis apparatus 1700 derives the S-S curve from the central values of the stresses and the strains of the respective voxels when the respective external strains are applied to the DP steel. The analysis apparatus 1700 derives, from the S-S curve, the tensile strength and the uniform elongation of the entire DP steel and the hole expansion ratio of the entire DP steel. The analysis apparatus 1700 derives the cumulative reward based on the tensile strength, the uniform elongation, and the hole expansion ratio of the entire DP steel. The analysis apparatus 1700 changes the value of the binarized label in each voxel of the microstructure 3D image and repeats the above-described processing until when the cumulative reward is converged. The analysis apparatus 1700 sets the value of the binarized label in each voxel x of the microstructure 3D image when the cumulative reward is converged, as the optimum value, and outputs the information indicating that.

Therefore, also in the present embodiment, it is possible to connect the physical phenomenon between the spatial hierarchies, similarly to the first embodiment. Accordingly, it becomes possible to derive the factor of the micro system (the form of the microstructure, the alloy component, and so on) from the factor of the macro system (the tensile strength, the uniform elongation, the hole expansion ratio, and so on of the entire DP steel) according to the physical phenomenon that occurs inside the DP steel based on a small number of data. Consequently, when the cause and the result connected by the physical phenomenon belong to the different spatial hierarchies, it is possible to accurately estimate the cause from the result.

MODIFIED EXAMPLES

First Modified Example

In the present embodiment, the explanation has been made by citing the case, as an example, where the analysis apparatus 1700 changes the phase (the soft phase or the hard phase) of each voxel of the microstructure 3D image. However, when the analysis target is the metal material, the target to be changed may also be any factor as long as it is a factor (physical quantity) regarding the microstructure. For example, it is possible to change at least any one of the above-described control factors (the form and the orientation of the three-dimensional microstructure, the addition amount of the alloy, and the compounding amount, the form distribution, the strength, and so on of each of the hard phase and the soft phase).

Second Modified Example

In the present embodiment, the explanation has been made by citing the case, as an example, where the analysis apparatus 1700 obtains the three-dimensional image, but, it is also possible to obtain a two-dimensional image.

Third Modified Example

In the present embodiment, the explanation has been made by citing, as an example, the tensile strength and the uniform elongation as the factors (physical quantities) regarding the mechanical property of the DP steel. However, the factors regarding the mechanical property of the DP steel are not limited to these, and, it is also possible to employ 0.2% proof stress or total elongation, for example.

Fourth Modified Example

In the present embodiment, the explanation has been made by citing the case, as an example, where the hole expansion ratio (being one example of the physical quantity indicating the hole expandability) is employed as the factor (physical quantity) regarding a fracture property of the DP steel. However, the factor regarding the fracture property is not limited to the hole expansion ratio. Further, it is not always required to derive the hole expansion ratio (the physical quantity representing the fracture property).

Fifth Modified Example

In the explanation of the present embodiment described above, the analysis apparatus 1700 may also determine whether or not it is possible to produce the DP steel having the microstructure with the value of the binarized label. For example, the analysis apparatus 1700 derives the relationship between the production condition and the microstructure of each voxel based on results of experiments, actual operations, and numerical analysis, for example. The analysis apparatus 1700 determines, based on this relationship, whether or not it is possible to perform the production at the value of the binarized label in each voxel of the microstructure 3D image. A timing of this determination can be set to a timing at which the state deriving section 1702 changes the value of the binarized label in each voxel of the microstructure 3D image based on the instruction issued from the outside. The timing of the determination may also be a timing at which the optimum value of the value of the binarized label in each voxel is obtained. When the value of the binarized label in each voxel of the microstructure 3D image is one at which the production cannot be realized, the analysis apparatus 1700 may also notify that it is not possible to perform the production at the value of the binarized label in each voxel of the microstructure 3D image. Further, the analysis apparatus 1700 performs the processing explained in the present embodiment by changing the value of the binarized label in each voxel of the microstructure 3D image. Further, it is also possible that the production condition is given, as a constraint condition of the aforementioned value function, to the value function based on a Lagrangian multiplier method, for example, to thereby perform optimization which takes a restriction condition into consideration.

Sixth Modified Example

In the present embodiment, the explanation has been made by citing the case, as an example, where the analysis target is the DP steel. However, the analysis target is not limited to the DP steel, and it is possible to use a steel material other than the DP steel or another metal material as the analysis target. Further, the analysis target may also be a material other than the metal material (a semiconductor, for example). Further, the analysis target may also be one other than the material.

The analysis target may also be a railway bogie, for example. In the case of the railway bogie, an agent (a designer of the railway bogie) applies a change (action) of arrangement, size, function, and so on of a part of the bogie, onto a drawing of the railway bogie being an environment. An analysis apparatus derives, by using a motion equation group describing a wheel set which should be satisfied when the railway bogie travels, a transversal vibration of the bogie and a vehicle, yawing, rolling, and so on, a variation of the above-described transversal vibration, yawing, and rolling as a state. Subsequently, the analysis apparatus derives, as a reward, an amount of change (increment or decrement) of an index value such as safety or riding comfort of the railway vehicle from at least one of the variation of the transversal vibration, the yawing, and the rolling, by using a mathematical expression representing a relation of these, and performs evaluation. In this case, the part of the bogie (the arrangement, the size, the function, and so on thereof) is designed. Note that the motion equation group describing the wheel set which should be satisfied when the railway bogie travels, the transversal vibration of the bogie and the vehicle, the yawing, the rolling, and so on, is realized by one described in Patent Literature 4, for example. The entire contents of the description and the drawings of Patent Literature 4 are incorporated herein by reference.

Further, the analysis target may also be an iron core being one of parts of an electric equipment, for example. In the case of the iron core, an agent (a designer of the electric equipment) applies a change (action) to a crystal orientation in a voxel in a three-dimensional image of the iron core being an environment. An analysis apparatus derives, based on Maxwell's equations, a magnetic flux density and an eddy current (corresponding to one period of excitation waveform) in the voxel as a state. Subsequently, the analysis apparatus derives, as a reward, an amount of change (decrement or increment) of an amount obtained by multiplying a core loss of the iron core by −1, based on the magnetic flux density and the eddy current corresponding to one period of the excitation waveform, and performs evaluation. In this case, the crystal orientation in the voxel in the three-dimensional image of the iron core is designed. Note that the core loss of the iron core is changed depending also on a shape of the iron core, so that it is sometimes required to perform evaluation as the iron core, without evaluating only the material (an electromagnetic steel sheet or the like) that composes the iron core.

Further, when it is not possible to observe the state (one corresponding to the phases (the soft phase and the hard phase) of the DP steel in the present embodiment), it is also possible to design such that an algorithm of partially observable Markov decision processes is employed, processing of estimating a state in a case of taking an action with respect to an environment is added, and the processing described in the present embodiment is performed.

Seventh Modified Example

In the present embodiment, the explanation has been made by citing the case, as an example, where the operation of changing the distribution of the microstructure in the VR space is performed by using the VR apparatus, and the changing of the value of the binarized label in each voxel of the microstructure 3D image so as to comply with the contents of the operation, is performed by try and error. However, there is no need to design as above. For example, the distribution of the microstructure can be decided by using a variation method. In this case, there is no need to mutually differentiate the way of giving the distribution of the microstructure. This is the same also in a case where a factor other than the distribution of the microstructure is set to the first factor.

Eighth Modified Example

The present embodiment can also employ the modified examples explained in the first embodiment.

OTHER MODIFIED EXAMPLES

Note that the embodiments of the present invention described above can be realized when a computer executes a program. Further, a computer-readable recording medium recording the aforementioned program and a computer program product such as the aforementioned program, can also be applied as the embodiment of the present invention. As the recording medium, for example, a flexible disk, a hard disk, an optical disk, a magneto-optical disk, a CD-ROM, a magnetic tape, a nonvolatile memory card, a ROM, and the like can be used.

Further, the embodiments of the present invention explained above merely illustrate concrete examples of implementing the present invention, and the technical scope of the present invention is not to be construed in a restrictive manner by these embodiments. That is, the present invention may be implemented in various forms without departing from the technical spirit or main features thereof.

This application is based upon and claims the benefit of priority of the prior Japanese Patent Application No. 2018-059579, filed in Japan on Mar. 27, 2018, the entire contents of which are incorporated herein by reference.

INDUSTRIAL APPLICABILITY

The present invention can be utilized for estimating a cause of a result obtained according to a physical phenomenon. For example, the present invention can be utilized for estimating a microstructure of a structural material having a desired mechanical property.

The invention claimed is:

1. An analysis system to analyze a material having a microstructure, comprising:
 a computer processor including processing circuitry programmed to perform operations comprising:
  (i) derive a second factor indicating a state in an analysis target, which is a product, when a first factor is given to the analysis target, according to a physical phenomenon with which the analysis target is to comply;
  (ii) derive, based on the second factor, a third factor according to a physical phenomenon with which the analysis target is to comply; and
 based on a result of evaluating the derived third factor, decide the first factor corresponding to the third factor, wherein:
 the third factor is a factor indicating a result occurred in the analysis target with both the first factor and the second factor as a cause;
 the second factor is a factor individually determined with respect to each of components of the analysis target;
 the third factor is not a factor individually determined with respect to each of the components of the analysis target but is a factor determined with respect to a set of the components of the analysis target;
 the computer processor is further configured to determine whether an evaluation value with respect to the derived third factor satisfies a predetermined condition,
 when the evaluation value with respect to the derived third factor does not satisfy the predetermined condition, the computer processor is further configured to set a new analysis target and newly derive the second factor indicating a state in the new analysis target and newly derive the third factor with respect to the new analysis target;
 the second factor indicates a state of the component in the new analysis target, and
 the computer processor is further configured to decide a production process of the product based on the evaluation value with respect to the derived third factor satisfying the predetermined condition, and the product is produced by using the production process.

2. The analysis system according to claim 1, wherein
the computer processor is programmed to derive the second factor by using a mathematical expression based on a physical phenomenon with which the analysis target is to comply.

3. The analysis system according to claim 1, wherein
the computer processor is programmed to derive the third factor by using a mathematical expression based on a physical phenomenon with which the analysis target is to comply.

4. The analysis system according to claim 1, wherein
when the evaluation value with respect to the derived third factor satisfies the predetermined condition, the computer processor is programmed to decide the first factor used for deriving the third factor, as the first factor corresponding to the third factor.

5. The analysis system according to claim 1, wherein
when the evaluation value with respect to the derived third factor satisfies the predetermined condition, the computer processor is programmed to decide a plurality of the first factors used until when the predetermined condition is satisfied, as the first factors corresponding to the third factor.

6. The analysis system according to claim 5, further comprising
the computer processor is programmed to create, from information indicating the analysis target being an initial one, a learning model of deriving the plurality of first factors corresponding to the third factor satisfying the predetermined condition, through performance of reinforcement learning, wherein
the (i) and (ii) are performed when the learning model is created.

7. The analysis system according to claim 6, wherein
the reinforcement learning is Q-learning.

8. The analysis system according to claim 6, further comprising
the computer processor is programmed to estimate the plurality of first factors corresponding to the third factor satisfying the predetermined condition, by using the learning model, wherein
the (i) and (ii) are performed when the plurality of first factors are estimated.

9. The analysis system according to claim 8, wherein:
the first factor is a factor indicating contents of transition of a component of the product;
the second factor is a factor indicating a state after the transition of the component of the product; and
the third factor is a factor determined with respect to a set of the components of the product.

10. The analysis system according to claim 8, wherein:
the analysis target is the material having the microstructure;
the first factor is a factor indicating contents of transition of a state of the microstructure of the material;
the second factor is a factor indicating a state after the transition of the microstructure of the material;
the third factor is a factor regarding a mechanical property in the entire material.

11. The analysis system according to claim 1, wherein:
an algorithm of Markov decision processes is used when deciding the first factor corresponding to the third factor;
a state in the Markov decision processes is a state of a component of the analysis target;
an action in the Markov decision processes is the first factor;
a reward in the Markov decision processes is the third factor; and
the second factor transits according to the first factor.

12. The analysis system according to claim 1, wherein:
the first factor is a factor indicating contents of transition of a state of a component of the product;
the second factor is a factor indicating a state after the transition of the component of the product; and
the third factor is a factor determined with respect to a set of the components of the product.

13. The analysis system according to claim 1, wherein:
the analysis target is a material having the microstructure;
the first factor is a factor indicating contents of transition of a state of the microstructure of the material;
the second factor is a factor indicating a state after the transition of the microstructure of the material; and
the third factor is a factor regarding a mechanical property in the entire material.

14. The analysis system according to claim 13, wherein
the computer processor is programmed to derive the third factor based on the microstructure obtained by performing a phase transformation on a microstructure in a state indicated by the second factor.

15. An analysis method to analyze a material having a microstructure, comprising:
deriving a second factor indicating a state in an analysis target, which is a product, when a first factor is given to the analysis target, according to a physical phenomenon with which the analysis target is to comply;
deriving, based on the second factor that is derived, a third factor according to a physical phenomenon with which the analysis target is to comply; and
based on a result of evaluating the third factor that is derived, decide the first factor corresponding to the third factor, wherein:
the third factor is a factor indicating a result occurred in the analysis target with both the first factor and the second factor as a cause;
the second factor is a factor individually determined with respect to each of components of the analysis target;
the third factor is not a factor individually determined with respect to each of the components of the analysis target but is a factor determined with respect to a set of the components of the analysis target;
determine whether an evaluation value with respect to the derived third factor satisfies a predetermined condition;
when the evaluation value with respect to the third factor that is derived does not satisfy the predetermined condition, a new analysis target is set, the second factor is newly derived and the third factor is newly derived with respect to the new analysis target;
the second factor indicates a state of the component in the new analysis target; and
deciding a production process of the product based on the evaluation value with respect to the derived third factor satisfying the predetermined condition, and the product is produced by using the production process.

16. A non-transitory computer-readable storage medium recording a program, executable by a computer processor including processing circuitry, to analyze a material having a microstructure, for making a computer execute:
deriving a second factor indicating a state in an analysis target, which is a product, when a first factor is given to the analysis target, according to a physical phenomenon with which the analysis target is to comply;

deriving, based on the second factor that is derived, a third factor according to a physical phenomenon with which the analysis target is to comply; and based on a result of evaluating the third factor that is derived, deciding the first factor corresponding to the third factor, wherein:

the third factor is a factor indicating a result occurred in the analysis target with both the first factor and the second factor as a cause;

the second factor is a factor individually determined with respect to each of components of the analysis target;

the third factor is not a factor individually determined with respect to each of the components of the analysis target but is a factor determined with respect to a set of the components of the analysis target;

determine whether an evaluation value with respect to the derived third factor satisfies a predetermined condition;

when the evaluation value with respect to the third factor that is derived does not satisfy the predetermined condition, a new analysis target is set, the second factor is newly derived, and the third factor is newly derived with respect to the new analysis target;

the second factor indicates a state of the component in the new analysis target; and deciding a production process of the product based on the evaluation value with respect to the derived third factor satisfying the predetermined condition, and the product is produced by using the production process.

* * * * *